(12) United States Patent
Herath et al.

(10) Patent No.: US 11,909,561 B2
(45) Date of Patent: Feb. 20, 2024

(54) TRANSMISSION IN AN INACTIVE STATE

(71) Applicants: Sanjeewa Herath, Ottawa (CA); Javad Abdoli, Kanata (CA); Jianglei Ma, Ottawa (CA)

(72) Inventors: Sanjeewa Herath, Ottawa (CA); Javad Abdoli, Kanata (CA); Jianglei Ma, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/586,957

(22) Filed: Jan. 28, 2022

(65) Prior Publication Data
US 2022/0158872 A1 May 19, 2022

Related U.S. Application Data

(63) Continuation of application No. 16/723,403, filed on Dec. 20, 2019, now Pat. No. 11,271,781.

(51) Int. Cl.
*H04W 72/04* (2023.01)
*H04L 25/02* (2006.01)
(Continued)

(52) U.S. Cl.
CPC ........ *H04L 25/0226* (2013.01); *H04L 1/0061* (2013.01); *H04L 5/0051* (2013.01);
(Continued)

(58) Field of Classification Search
CPC ........... H04W 72/042; H04W 72/0446; H04W 68/005; H04W 76/11; H04W 72/044;
(Continued)

(56) References Cited

U.S. PATENT DOCUMENTS

2013/0294318 A1 11/2013 Amerga et al.
2014/0073356 A1* 3/2014 Siomina ............... H04W 4/029
455/456.2
(Continued)

FOREIGN PATENT DOCUMENTS

CN 108696340 A 10/2018
WO 2018086600 A1 5/2018
(Continued)

OTHER PUBLICATIONS

ZTE, ZTE Microelectronics, Consideration on DL Data Transmission in RRC_INACTIVE State, R2-1701929, 3GPP TSG-RAN WG2 #97, Athens, Greece, Feb. 13-17, 2017, 4 pages.
(Continued)

*Primary Examiner* — Wei Zhao

(57) ABSTRACT

Some embodiments of the present disclosure provide control signaling mechanisms to support data transmission by a user equipment (UE) that is in the RRC_INACTIVE state and, more generally, in any inactive state. Beyond simply supporting data transmission by a user equipment that is in the RRC_INACTIVE state, aspects of the present application provide mechanisms for configuring the UE for preamble transmission or sounding reference signal (SRS) transmission and for toggling between such transmissions. Aspects of the present application relate to mechanisms for enabling Timing Advance estimation, which mechanisms are not burdened with high overhead and which allow the UE to remain in the RRC_INACTIVE state.

18 Claims, 26 Drawing Sheets

(51) Int. Cl.
   *H04L 5/00*    (2006.01)
   *H04W 76/11*   (2018.01)
   *H04W 68/00*   (2009.01)
   *H04L 1/00*    (2006.01)
   *H04W 72/23*   (2023.01)

(52) U.S. Cl.
   CPC ......... *H04W 68/005* (2013.01); *H04W 72/23* (2023.01); *H04W 76/11* (2018.02)

(58) Field of Classification Search
   CPC .. H04W 72/04; H04L 25/0226; H04L 25/022; H04L 5/0051; H04L 5/005; H04L 1/0061
   See application file for complete search history.

(56) References Cited

U.S. PATENT DOCUMENTS

| | | |
|---|---|---|
| 2018/0206262 A1 | 7/2018 | Cao et al. |
| 2018/0368196 A1 | 12/2018 | Gage |
| 2020/0137602 A1 | 4/2020 | Zhang et al. |
| 2021/0051672 A1* | 2/2021 | Rastegardoost .. H04W 72/0493 |
| 2021/0127351 A1* | 4/2021 | Stojanovski ......... H04W 48/16 |
| 2021/0259040 A1 | 8/2021 | Babaei |
| 2022/0030544 A1 | 1/2022 | Zhou et al. |

FOREIGN PATENT DOCUMENTS

| | | |
|---|---|---|
| WO | 2021119127 A1 | 6/2021 |
| WO | 2022007666 A1 | 1/2022 |

OTHER PUBLICATIONS

CATT, Support Data Transmission in Inactive State, R2-164807, 3GPP TSG RAN WG2 Meeting #95, Gothenburg, Sweden, Aug. 22-26, 2016, 9 pages.

Huawei, HiSilicon, Xinwei, WF on NR SRS, R1-161336, 3GPP TSG RAN WG1 Meeting #87, Reno, USA, Nov. 14-18, 2016, Agenda item: 7.1.3.2, 4 pages.

3GPP TS 38.211; Technical Specification Group Radio Access Network; NR; Physical channels and modulation (Release 15), Version V15.8.0 (Dec. 2019); pp. 1-97.

3GPP TS 38.214; Technical Specification Group Radio Access Network; NR; Physical layer procedures for data (Release 15), Version V15.8.0 (Dec. 2019); pp. 1-106.

3GPP TS 38.304; Technical Specification Group Radio Access Network; NR; User Equipment (UE) procedures in Idle mode and RRC Inactive state (Release 15), Version V15.6.0 (Dec. 2019); pp. 1-30.

3GPP TS 38.321; Technical Specification Group Radio Access Network; NR; Medium Access Control (MAC) protocol specification (Release 15), Version V15.8.0 (Dec. 2019); pp. 1-78.

3GPP TS 38.331; Technical Specification Group Radio Access Network; NR; Radio Resource Control (RRC) protocol specification (Release 15), Version V15.8.0 (Dec. 2019); pp. 1-532.

VIVO: "Idle and Inactive Mode Positioning", 3GPP Draft; R2-1900500, XP051601885, Athens, Greece, Feb. 15, 2019, total 4 pages.

VIVO: "Views on NR DL and UL positioning techniques", 3GPP Draft; R1-1901716, XP051599412, Athens, Greece, Feb. 16, 2019, total 5 pages.

Qualcomm Incorporated: "NR uplink measurement based mobility in RRC_Inactive", 3GPP Draft R2-1700582, XP051211154, Spokane, USA, Jan. 17, 2017, total 4 pages.

Huawei et al: "Design of UL based mobility in RRC_inactive", 3GPP Draft; R2-1701803, XP051212369, Athens, Greece, Feb. 12, 2017, total 5 pages.

3GPP TS 38.300 V15.7.0 (Sep. 2019), 3rd Generation Partnership Project: Technical Specification Group Radio Access Network; NR; NR and NG-RAN Overall Description; Stage 2(Release 15), 99 pages.

3GPP TS 24.501 V16.2.0 (Sep. 2019), 3rd Generation Partnership Project; Technical Specification Group Core Network and Terminals; Non-Access-Stratum (NAS) protocol for 5G System (5GS); Stage 3(Release 16), 611 pages.

3GPP TS 38.213 V15.7.0 (Sep. 2019), 3rd Generation Partnership Project; Technical Specification Group Radio Access Network; NR; Physical layer procedures for control (Release 15), 108 pages.

Sierra Wireless, Email discussion [104∩43][eMTC and NB-IoT R16] D-PUR report. 3GPP TSG-RAN WG2 Meeting#105, Athens, Greece, Feb. 25-Mar. 1 2019, R2-1900120, 45 pages.

* cited by examiner

```
-- ASN1START
-- TAG-PAGING-START

Paging ::=                      SEQUENCE {
    pagingRecordList                PagingRecordList        OPTIONAL,   -- Need N
    lateNonCriticalExtension        OCTET STRING            OPTIONAL,
    nonCriticalExtension            SEQUENCE{}              OPTIONAL
}

PagingRecordList ::=    SEQUENCE (SIZE(1..maxNrofPageRec)) OF PagingRecord
PagingRecord ::=        SEQUENCE {
    ue-Identity                 PagingUE-Identity,
    accessType                  ENUMERATED (non3GPP)        OPTIONAL,   -- Need N
    ...
}

PagingUE-Identity ::=   CHOICE {
    ng-5G-S-TMSI                NG-5G-S-TMSI,
    fullI-RNTI                  I-RNTI-Value,
    ...
}

-- TAG-PAGING-STOP
-- ASN1STOP
```

FIG. 6 (PRIOR ART)

| Bit field value | Interpretation |
|---|---|
| 00 | Reserved |
| 01 | Only scheduling information for Paging is present in the DCI |
| 10 | Only short message is present in the DCI |
| 11 | Both scheduling information for Paging and short message are present in the DCI |

FIG. 7 (PRIOR ART)

| Bit | Short Message |
|---|---|
| 1 | *systemInfoModification*<br>If set to 1: indication of a BCCH modification other than SIB6, SIB7 and SIB8. |
| 2 | *etwsAndCmasIndication*<br>If set to 1: indication of an ETWS primary notification and/or an ETWS secondary notification and/or a CMAS notification. |
| 3–8 | Not used in this release of the specification, and shall be ignored by UE if received. |

| Bit | Short Message |
|---|---|
| 1 | *systemInfoModification* <br> If set to 1: indication of a BCCH modification other than SIB6, SIB7 and SIB8. |
| 2 | *etwsAndCmasIndication* <br> If set to 1: indication of an ETWS primary notification and/or an ETWS secondary notification and/or a CMAS notification. |
| 3–8 | *preambleOrSRSIndication* <br> If set to 0: indication of preamble transmission and otherwise, SRS transmission |

```
-- ASN1START
-- TAG-PAGING-START

Paging ::=                      SEQUENCE {
    pagingRecordList                    PagingRecordList    OPTIONAL,   -- Need N
    lateNonCriticalExtension            OCTET STRING        OPTIONAL,
    nonCriticalExtension                SEQUENCE{}          OPTIONAL
}

PagingRecordList ::=    SEQUENCE (SIZE(1..maxNrofPageRec)) OF PagingRecord
PagingRecord ::=        SEQUENCE {
    ue-Identity                 PagingUE-Identity,
    accessType                  ENUMERATED (non3GPP)            OPTIONAL,   -- Need N
    preambleOrSRSIndication     ENUMERATED (SRS, PREAMBLE)
    ...
}

PagingUE-Identity ::=   CHOICE {
    ng-5G-S-TMSI            NG-5G-S-TMSI,
    fullI-RNTI              I-RNTI-Value,
    ...
}

-- TAG-PAGING-STOP
-- ASN1STOP
```

| PagingUE-Identity | Preamble Index |
|---|---|
| PagingUE-Identity0 | 0 |
| PagingUE-Identity1 | 1 |
| ... | ... |

| PagingUE-Identity | SRS Index |
|---|---|
| PagingUE-Identity0 | 0 |
| PagingUE-Identity1 | 1 |
| ... | ... |

FIG. 13B

```
-- ASN1START
-- TAG-PAGING-START

Paging ::=                      SEQUENCE {
    pagingRecordList                PagingRecordList        OPTIONAL,   -- Need N
    lateNonCriticalExtension        OCTET STRING            OPTIONAL,
    nonCriticalExtension            SEQUENCE{}              OPTIONAL
}

PagingRecordList ::=            SEQUENCE (SIZE(1..maxNrofPageRec)) OF PagingRecord
PagingRecord ::=                SEQUENCE {
    ue-Identity                     PagingUE-Identity,
    accessType                      ENUMERATED (non3GPP)    OPTIONAL,   -- Need N
    referencesignalIndex            ReferenceSignalIndex
}

PagingUE-Identity ::=           CHOICE {
    ng-5G-S-TMSI                    NG-5G-S-TMSI,
    fullI-RNTI                      I-RNTI-value,
    ...
}

-- TAG-PAGING-STOP
-- ASN1STOP
```

FIG. 14

```
-- ASN1START
-- TAG-PAGING-INACTIVE-START
PagingInactiveState ::=    SEQUENCE {
    pagingRecordListInactive    PagingRecordListInactive    OPTIONAL,  -- Need N
}

PagingRecordListInactive ::= SEQUENCE (SIZE(1..maxNrofPageRecInactive)) OF
PagingRecordInactive
PagingRecordInactive::=    SEQUENCE {
    ue-Identity        PagingUE-Identity,
    referencesignalIndex    ReferenceSignalIndex
    ...
}

PagingUE-Identity ::=    CHOICE {
    ng-5G-S-TMSI        NG-5G-S-TMSI,
    full-I-RNTI        I-RNTI-value,
    ...
}

-- TAG-PAGING-INACTIVE-STOP
-- ASN1STOP
```

FIG. 15

| Bit | Short Message |
|---|---|
| 1 | *systemInfoModification*<br>If set to 1: indication of a BCCH modification other than SIB6, SIB7 and SIB8. |
| 2 | *etwsAndCmasIndication*<br>If set to 1: indication of an ETWS primary notification and/or an ETWS secondary notification and/or a CMAS notification. |
| 3–8 | *idleOrInactiveIndication*<br>If set to 0: indication of IDLE state and otherwise, INACTIVE state. |

FIG. 17

| Bit | Short Message |
|---|---|
| 1 | *systemInfoModification*<br>If set to 1: indication of a BCCH modification other than SIB6, SIB7 and SIB8. |
| 2 | *etwsAndCmasIndication*<br>If set to 1: indication of an ETWS primary notification and/or an ETWS secondary notification and/or a CMAS notification. |
| 3–8 | *UEGroup*<br>m bits: indicates the group ID and the paging message is to be used/processed by the UEs assigned to the indicated group and ignored by others UEs |

| Bit | SRS transmission CP adjustment |
|---|---|
| 0 | Increment by RRC configured amount |
| 1 | Decrement by RRC configured amount |

| Bit | SRS transmission CP adjustment |
|---|---|
| 00 | Decrement by the RRC configured amount |
| 01 | Increment by half the RRC configured amount |
| 10 | Increment by once the RRC configured amount |
| 11 | Increment by twice the RRC configured amount |

| Configuration | Adjustment value |
|---|---|
| configured amount 0 | $b_0$ |
| configured amount 1 | $b_1$ |
| configured amount 2 | $b_2$ |
| configured amount 3 | $b_3$ |

FIG. 19C

TRANSMISSION IN AN INACTIVE STATE

CROSS REFERENCE TO RELATED APPLICATIONS

The present application is a continuation of U.S. patent application Ser. No. 16/723,403, filed Dec. 20, 2019.

TECHNICAL FIELD

The present disclosure relates generally to wireless communications and, in particular embodiments, to control signaling in wireless communication networks, where the control signaling acts to cause transmissions to be carried out in an inactive state.

BACKGROUND

In some wireless communication networks, multiple user equipments (UEs) wirelessly communicate with a base station to send data to the base station and/or receive data from the base station. A wireless communication from a UE to a base station is referred to as an uplink (UL) communication. A wireless communication from a base station to a UE is referred to as a downlink (DL) communication. A wireless communication from a first UE to a second UE is referred to as a sidelink (SL) communication or a device-to-device (D2D) communication.

In 3GPP New Radio (NR), a UE may operate in one of the following three Radio Resource Control (RRC) states, illustrated in FIG. 26 among the accompanying drawings: an RRC_IDLE state 2602; an RRC_CONNECTED state 2604; and an RRC_INACTIVE state 2606. In other documentation, these states may be referenced as "modes", for example, "RRC_IDLE mode". When a UE is in the RRC_CONNECTED state 2604, the UE may be considered to have been connected to the network as a result of a connection establishment procedure 2624. When a UE has transitioned to the RRC_IDLE state 2602, say, by way of a release procedure 2642 or by way of a release procedure 2662, the UE is not connected to the network, but the network knows that the UE is present in the network. By switching to the RRC_INACTIVE state 2606 by way of a release with suspend procedure 2646, the UE helps save network resources and UE power (thereby lengthening, for example, perceived battery life). The RRC_INACTIVE state 2606 may be useful, for example, in those instances when the UE is not communicating with the network. When a UE is in the RRC_INACTIVE state 2606, the UE is also helping save network resources and UE power. However, when the UE is in the RRC_INACTIVE state 2606, the network and the UE both store at least some configuration information to, thereby, allow the UE to reconnect to the network, by way of a resume procedure 2664, more rapidly than the UE would be able to reconnect, by way of the connection establishment procedure 2624, in the case wherein the UE is in the RRC_IDLE state 2602. The storage of at least some configuration information when the UE is in the RRC_INACTIVE state 2606 is one aspect that distinguishes the RRC_INACTIVE state 2606 from the RRC_IDLE state 2602. Notably, the acronym RRC is a reference to the known Radio Resource Control protocol.

Conventionally, when a UE is in the RRC_INACTIVE state 2606, data transmission to and from the UE is limited.

SUMMARY

The RRC_INACTIVE state 2606 is an example of an inactive state. Currently, there are limited control signaling mechanisms to support data transmission to or from a UE that is in the RRC_INACTIVE state 2606. Some embodiments of the present disclosure provide control signaling mechanisms to support transmission of reference signals in the RRC_INACTIVE state 2606 and, more generally, in any inactive state.

According to an aspect of the present disclosure, there is provided a method including receiving, by a user equipment (UE) in an inactive state, an instruction and, responsive to the instruction, transmitting a sounding reference signal (SRS) transmission while in the inactive state. Additionally, aspects of the present application provide a user equipment for carrying out this method.

According to an aspect of the present disclosure, there is provided a method including receiving, by a user equipment (UE) in an inactive state, an instruction and, responsive to the instruction, transmitting a preamble transmission and remaining in the inactive state. Additionally, aspects of the present application provide a user equipment for carrying out this method.

According to an aspect of the present disclosure, there is provided a method including receiving, by a user equipment (UE), a control message, the control message instructing the UE to configure a sounding reference signal (SRS) for SRS transmission in an RRC inactive (RRC_INACTIVE) state, wherein the UE is in RRC connected (RRC_CONNECTED) state, responsive to the receiving the control message, entering, by the UE, into the RRC_INACTIVE state from RRC_CONNECTED state and transmitting, by the UE, a sounding reference signal (SRS) transmission while in the RRC_INACTIVE state.

According to an aspect of the present disclosure, there is provided a user equipment (UE) including a receiver configured to receive a control message, the control message instructing the UE to configure a sounding reference signal (SRS) for SRS transmission in an RRC inactive (RRC_INACTIVE) state, wherein the UE is in RRC connected (RRC_CONNECTED) state, a processor configured to, responsive to the receiving the control message, enter into the RRC_INACTIVE state from the RRC_CONNECTED state and a transmitter configured to transmit a SRS transmission while the UE is in the RRC_INACTIVE state.

According to an aspect of the present disclosure, there is provided a non-transitory computer readable storage medium, having stored thereon computer-executable instructions, that when executed by a processor in a user equipment (UE), cause the processor to receive a control message, the control message instructing the UE to configure a sounding reference signal (SRS) for SRS transmission in an RRC inactive (RRC_INACTIVE) state, wherein the UE is in RRC connected (RRC_CONNECTED) state, responsive to the receiving the control message, enter into the RRC_INACTIVE state from the RRC_CONNECTED state and transmit a SRS transmission while in the RRC_INACTIVE state.

BRIEF DESCRIPTION OF THE DRAWINGS

For a more complete understanding of the present embodiments, and the advantages thereof, reference is now made, by way of example, to the following descriptions taken in conjunction with the accompanying drawings, in which:

FIG. 6 illustrates a known paging message;

FIG. 7 illustrates a table of interpretations of the known two-bit "Short Message Indicator" downlink control information (DCI) field;

FIG. 9 illustrates a table of interpretations of the known eight-bit "Short Message" DCI field;

FIG. 10 illustrates a table of interpretations of a proposed eight-bit "Short Message" DCI field;

FIG. 12 illustrates an adapted paging message;

FIG. 13A illustrates a table for mapping values to specific indices that provide references to configuration details for preamble transmissions;

FIG. 13B illustrates a table for mapping values to specific indices that provide references to configuration details for Sounding Reference Signal (SRS) transmissions;

FIG. 14 illustrates an adapted paging message distinct from the adapted paging message illustrated in FIG. 12;

FIG. 15 illustrates an adapted paging message distinct from the adapted paging messages illustrated in FIGS. 12 and 14;

FIG. 17 illustrates a table of interpretations of a proposed eight-bit "Short Message" DCI field;

FIG. 18 illustrates a table of interpretations of a proposed eight-bit "Short Message" DCI field;

FIG. 19A illustrates a table of interpretations of a proposed one-bit SRS cyclic prefix (CP) adjustment/offset indication bit field;

FIG. 19B illustrates a table of interpretations of a proposed two-bit SRS CP adjustment/offset indication bit field referencing configured amounts;

FIG. 19C illustrates a table of the configured amounts referenced in FIG. 19B;

DETAILED DESCRIPTION OF ILLUSTRATIVE EMBODIMENTS

For illustrative purposes, specific example embodiments will now be explained in greater detail in conjunction with the figures.

The embodiments set forth herein represent information sufficient to practice the claimed subject matter and illustrate ways of practicing such subject matter. Upon reading the following description in light of the accompanying figures, those of skill in the art will understand the concepts of the claimed subject matter and will recognize applications of these concepts not particularly addressed herein. It should be understood that these concepts and applications fall within the scope of the disclosure and the accompanying claims.

Moreover, it will be appreciated that any module, component, or device disclosed herein that executes instructions may include, or otherwise have access to, a non-transitory computer/processor readable storage medium or media for storage of information, such as computer/processor readable instructions, data structures, program modules and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile discs (i.e., DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Computer/processor readable/executable instructions to implement an application or module described herein may be stored or otherwise held by such non-transitory computer/processor readable storage media.

FIGS. 1, 2A, 2B and 3 illustrate examples of networks and devices that could implement any or all aspects of the present disclosure.

Figure 1:
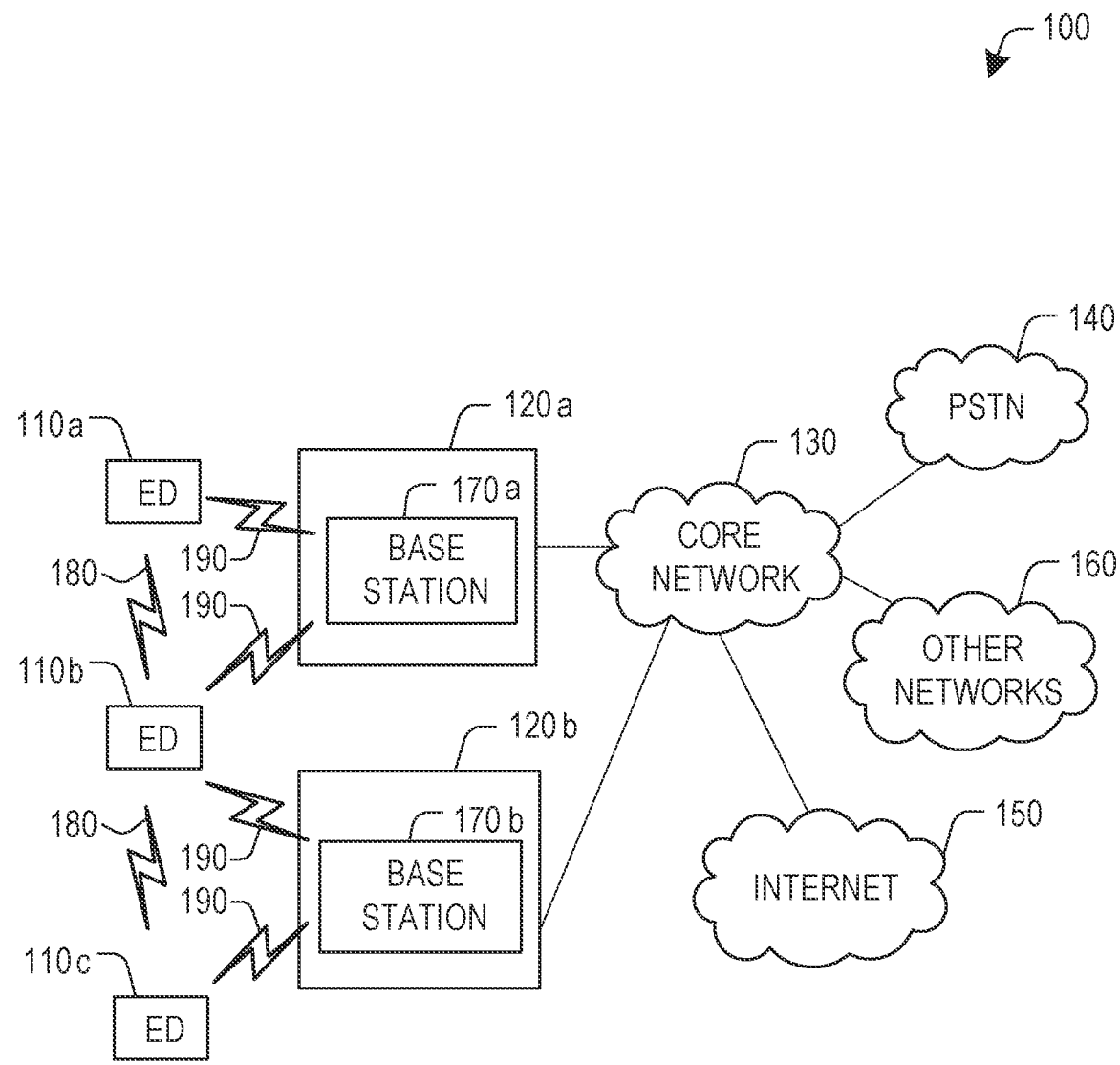
FIG. 1 is a schematic diagram of a communication system in which embodiments of the disclosure may occur, the communication system includes an example user equipment and an example base station.

FIG. 1 illustrates an example communication system 100. In general, the system 100 enables multiple wireless or wired elements to communicate data and other content. The purpose of the system 100 may be to provide content (voice, data, video, text) via broadcast, narrowcast, user device to user device, etc. The system 100 may operate efficiently by sharing resources, such as bandwidth.

In this example, the communication system 100 includes electronic devices (ED) 110a-110c (individually or collectively 110), radio access networks (RANs) 120a-120b (individually or collectively 120), a core network 130, a public switched telephone network (PSTN) 140, the Internet 150 and other networks 160. Although certain numbers of these components or elements are shown in FIG. 1, any reasonable number of these components or elements may be included in the system 100.

The EDs 110a-110c are configured to operate, communicate, or both, in the system 100. For example, the EDs 110a-110c are configured to transmit, receive, or both via wireless communication channels. Each ED 110a-110c represents any suitable end user device for wireless operation and may include such devices (or may be referred to) as a user equipment/device (UE), wireless transmit/receive unit (WTRU), mobile station, mobile subscriber unit, cellular telephone, station (STA), machine type communication device (MTC), personal digital assistant (PDA), smartphone, laptop, computer, touchpad, wireless sensor, or consumer electronics device.

In FIG. 1, the RANs 120a-120b include base stations 170a-170b (individually or collectively 170), respectively. Each base station 170a-170b is configured to wirelessly interface with one or more of the EDs 110 to enable access to any other base station 170, the core network 130, the PSTN 140, the internet 150, and/or the other networks 160. For example, the base stations 170 may include (or be) one or more of several well-known devices, such as a base transceiver station (BTS), a Node-B (NodeB), an evolved NodeB (eNodeB), a Home eNodeB, a gNodeB, a transmission and receive point (TRP), a site controller, an access point (AP), or a wireless router. Any ED 110a-110c may be alternatively or additionally configured to interface, access, or communicate with any other base station 170, the internet 150, the core network 130, the PSTN 140, the other networks 160, or any combination of the preceding. The communication system 100 may include RANs, such as the RAN 120b, wherein the corresponding base station 170b accesses the core network 130 via the internet 150, as shown.

The EDs 110a-110c and base stations 170a-170b are examples of communication equipment that can be configured to implement some or all of the functionality and/or embodiments described herein. In the embodiment shown in FIG. 1, the base station 170a forms part of the RAN 120a, which may include other base stations, base station controller(s) (BSC), radio network controller(s) (RNC), relay nodes, elements, and/or devices. Any base station 170a, 170b may be a single element, as shown, or multiple elements, distributed in the corresponding RAN, or otherwise. Also, the base station 170b forms part of the RAN 120b, which may include other base stations, elements, and/or devices. Each base station 170a-170b transmits and/or receives wireless signals within a particular geographic region or area, sometimes referred to as a "cell" or "coverage area." A cell may be further divided into cell sectors and a base station 170a-170b may, for example, employ multiple transceivers to provide service to multiple sectors. In some embodiments, there may be established pico or femto cells where the radio access technology supports such. In some embodiments, multiple transceivers could be used for each cell, for example using multiple-input multiple-output (MIMO) technology. The number of RANs 120 shown is exemplary only. Any number of RAN may be contemplated when devising the communication system 100.

The base stations 170a-170b communicate with one or more of the EDs 110a-110c over one or more air interfaces 190 using wireless communication links, e.g., radio frequency (RF) wireless communication links, microwave wireless communication links, infrared (IR) wireless communication links, etc. The air interfaces 190 may utilize any suitable radio access technology. For example, the communication system 100 may implement one or more orthogonal or non-orthogonal channel access methods, such as code division multiple access (CDMA), time division multiple access (TDMA), frequency division multiple access (FDMA), orthogonal FDMA (OFDMA) or single-carrier FDMA (SC-FDMA) in the air interfaces 190.

A base station 170a-170b may implement Universal Mobile Telecommunication System (UMTS) Terrestrial Radio Access (UTRA) to establish an air interface 190 using wideband CDMA (WCDMA). In doing so, the base station 170a-170b may implement protocols such as High Speed Packet Access (HSPA), Evolved HPSA (HSPA+) optionally including High Speed Downlink Packet Access (HSDPA), High Speed Packet Uplink Access (HSUPA) or both. Alternatively, a base station 170a-170b may establish an air interface 190 with Evolved UTMS Terrestrial Radio Access (E-UTRA) using LTE, LTE-A, LTE-B and/or 5G New Radio (NR). It is contemplated that the communication system 100 may use multiple channel access functionality, including such schemes as described above. Other radio technologies for implementing air interfaces include IEEE 802.11, 802.15, 802.16, CDMA2000, CDMA2000 1x, CDMA2000 EV-DO, IS-2000, IS-95, IS-856, GSM, EDGE, and GERAN. Of course, other multiple access schemes and wireless protocols may be utilized.

The RANs 120 are in communication with the core network 130 to provide the EDs 110 with various services such as voice, data, and other services. The RANs 120 and/or the core network 130 may be in direct or indirect communication with one or more other RANs (not shown), which may or may not be directly served by the core network 130 and may or may not employ the same radio access technology as RAN 120a, RAN 120b or both. The core network 130 may also serve as a gateway access between (i) the RANs 120 or EDs 110 or both, and (ii) other networks (such as the PSTN 140, the internet 150, and the other networks 160).

The EDs 110 communicate with one another over one or more SL air interfaces 180 using wireless communication links, e.g., radio frequency (RF) wireless communication links, microwave wireless communication links, infrared (IR) wireless communication links, etc. The SL air interfaces 180 may utilize any suitable radio access technology and may be substantially similar to the air interfaces 190 over which the EDs 110a-110c communication with one or more of the base stations 170a-170c, or they may be substantially different. For example, the communication system 100 may implement one or more channel access methods, such as CDMA, TDMA, FDMA, OFDMA or SC-FDMA in the SL air interfaces 180. In some embodiments, the SL air interfaces 180 may be, at least in part, implemented over unlicensed spectrum.

In this disclosure, the SL transmissions between cooperating UEs may be "grant-free" transmissions or as a mode for data transmissions that are performed without communicating dynamic scheduling. Grant-free transmissions are sometimes called "configured grant," "grant-less," "schedule free," or "schedule-less" transmissions. Grant-free SL transmissions can also be referred to as SL "transmission without grant," "transmission without dynamic grant," "transmission without dynamic scheduling," or "transmission using configured grant," for example.

A configured grant transmission typically requires the receiver to know the parameters and resources used by the transmitter for the transmission. However, in the context of SL transmissions, the receiving UE is typically not aware of the transmitting UE's configuration parameters, such as which UE is transmitting, the ultimate target of the data (e.g., another UE), the time-domain and frequency-domain communication resources used for the transmission, and other control information. The various methods will, however, each incur a respective overhead penalty.

In addition, some or all of the EDs 110a-110c may include functionality for communicating with different wireless networks over different wireless links using different wireless technologies and/or protocols. Instead of wireless communication (or in addition thereto), the EDs may communicate via wired communication channels to a service provider or switch (not shown) and to the internet 150. PSTN 140 may include circuit switched telephone networks for providing plain old telephone service (POTS). Internet 150 may include a network of computers and subnets (intranets) or both, and incorporate protocols, such as internet protocol (IP), transmission control protocol (TCP) and user datagram protocol (UDP). EDs 110a-110c may be multimode devices capable of operation according to multiple radio access technologies, and incorporate multiple transceivers necessary to support multiple radio access technologies.

Figure 2A:
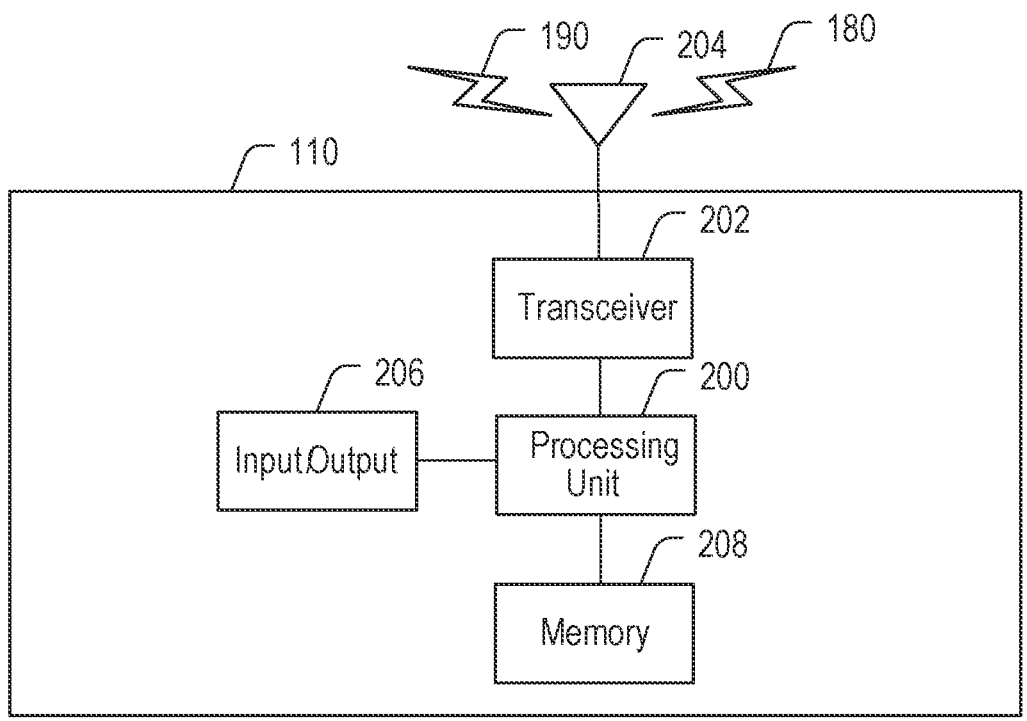
FIG. 2A illustrates, as a block diagram, the example user equipment of FIG. 1, according to aspects of the present disclosure.
Figure 2B:
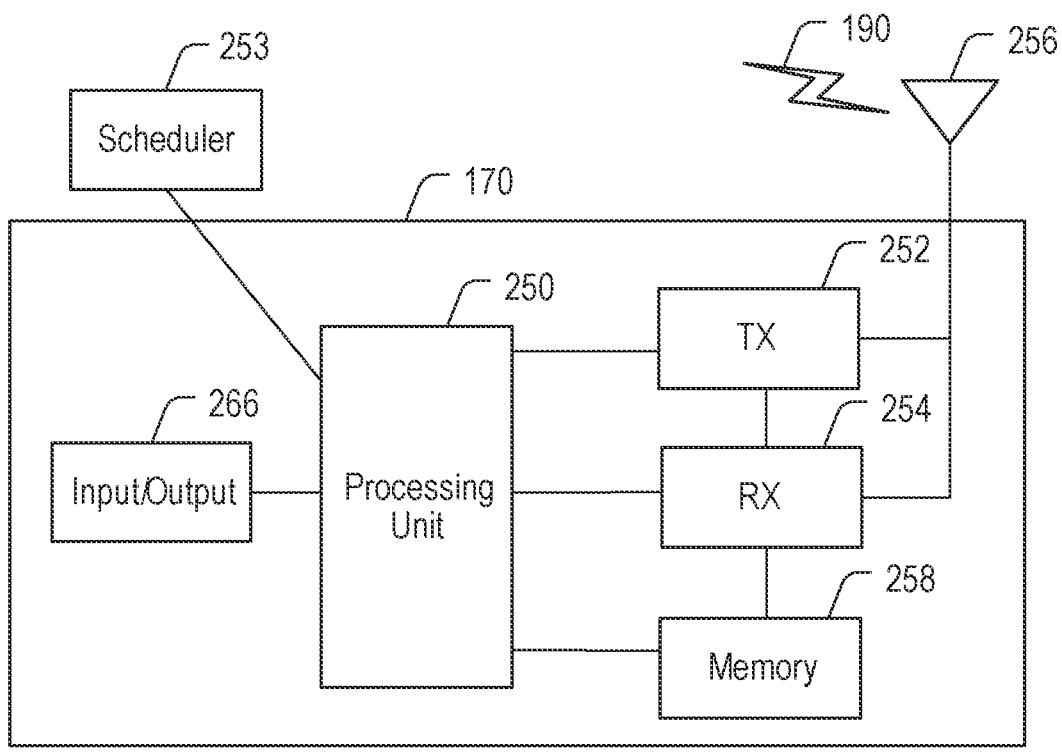
FIG. 2B illustrates, as a block diagram, the example base station of FIG. 1, according to aspects of the present disclosure.

FIGS. 2A and 2B illustrate example devices that may implement the methods and teachings according to this disclosure. In particular, FIG. 2A illustrates an example ED 110 and FIG. 2B illustrates an example base station 170. These components could be used in the system 100 or in any other suitable system.

As shown in FIG. 2A, the ED 110 includes at least one processor or processing unit 200. The processing unit 200 implements various processing operations of the ED 110. For example, the processing unit 200 could perform signal coding, bit scrambling, data processing, power control, input/output processing, or any other functionality enabling the ED 110 to operate in the communication system 100. The processing unit 200 may also be configured to implement some or all of the functionality and/or embodiments described in more detail herein. Each processing unit 200 includes any suitable processing or computing device configured to perform one or more operations. Each processing unit 200 could, for example, include a microprocessor, microcontroller, digital signal processor, field programmable gate array, or application specific integrated circuit.

The ED 110 also includes at least one transceiver 202. The transceiver 202 is configured to modulate data or other content for transmission by at least one antenna or Network Interface Controller (NIC) 204. The transceiver 202 is also configured to demodulate data or other content received by the at least one antenna 204. Each transceiver 202 includes any suitable structure for generating signals for wireless or wired transmission and/or processing signals received wirelessly or by wire. Each antenna 204 includes any suitable structure for transmitting and/or receiving wireless or wired signals. One or multiple transceivers 202 could be used in the ED 110. One or multiple antennas 204 could be used in the ED 110. Although shown as a single functional unit, a transceiver 202 could also be implemented using at least one transmitter and at least one separate receiver.

The ED 110 further includes one or more input/output devices 206 or interfaces (such as a wired interface to the internet 150). The input/output devices 206 permit interaction with a user or other devices in the network. Each input/output device 206 includes any suitable structure for providing information to or receiving information from a user, such as a speaker, microphone, keypad, keyboard, display, or touch screen, including network interface communications.

In addition, the ED 110 includes at least one memory 208. The memory 208 stores instructions and data used, generated, or collected by the ED 110. For example, the memory 208 could store software instructions or modules configured to implement some or all of the functionality and/or embodiments described above and that are executed by the processing unit(s) 200. Each memory 208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 2B, the base station 170 includes at least one processing unit 250, at least one transmitter 252, at least one receiver 254, one or more antennas 256, at least one memory 258 and one or more input/output devices or interfaces 266. A transceiver, not shown, may be used instead of the transmitter 252 and receiver 254. A scheduler 253 may be coupled to the processing unit 250. The scheduler 253 may be included within or operated separately from the base station 170. The processing unit 250 implements various processing operations of the base station 170, such as signal coding, bit scrambling, data processing, power control, input/output processing, or any other functionality. The processing unit 250 can also be configured to implement some or all of the functionality and/or embodiments described in more detail above. Each processing unit 250 includes any suitable processing or computing device configured to perform one or more operations. Each processing unit 250 could, for example, include a microprocessor, microcontroller, digital signal processor, field programmable gate array, or application specific integrated circuit.

Each transmitter 252 includes any suitable structure for generating signals for wireless or wired transmission to one or more EDs or other devices. Each receiver 254 includes any suitable structure for processing signals received wirelessly or by wire from one or more EDs or other devices. Although shown as separate components, at least one transmitter 252 and at least one receiver 254 could be combined into a transceiver. Each antenna 256 includes any suitable structure for transmitting and/or receiving wireless or wired signals. Although a common antenna 256 is shown here as being coupled to both the transmitter 252 and the receiver 254, one or more antennas 256 could be coupled to the transmitter(s) 252, and one or more separate antennas 256 could be coupled to the receiver(s) 254. Each memory 258 includes any suitable volatile and/or non-volatile storage and retrieval device(s) such as those described above in connection to the ED 110. The memory 258 stores instructions and data used, generated, or collected by the base station 170. For example, the memory 258 could store software instructions or modules configured to implement some or all of the functionality and/or embodiments described above and that are executed by the processing unit(s) 250.

Each input/output device 266 permits interaction with a user or other devices in the network. Each input/output device 266 includes any suitable structure for providing information to or receiving/providing information from a user, including network interface communications.

Additional details regarding the UEs 110 and the base stations 170 are known to those of skill in the art. As such, these details are omitted here for clarity.

Figure 3:
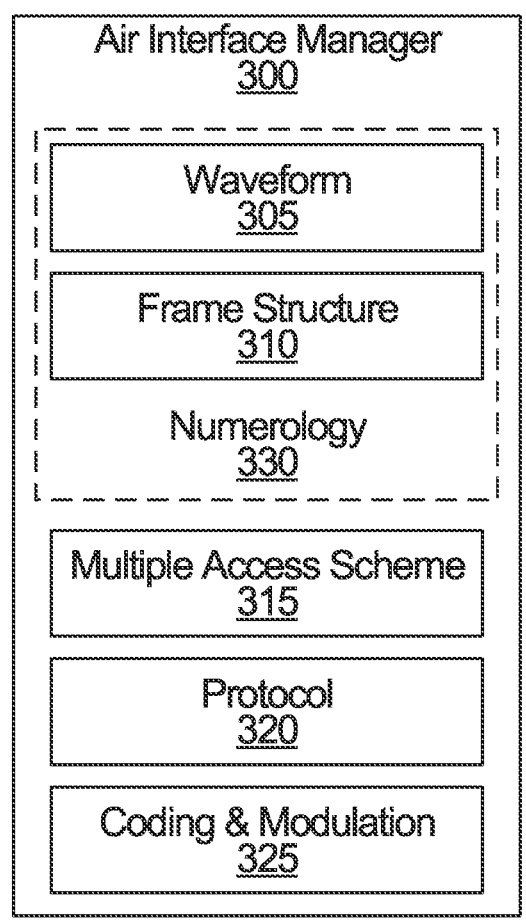
FIG. 3 illustrates, as a block diagram, an air interface manager for configuring a software-configurable air interface according to an aspect of the present disclosure.

FIG. 3 illustrates a schematic diagram of an air interface manager 300 for configuring a software-configurable air interface 190. The air interface manager 300 may be, for example, a module including a number of components or building blocks that define the parameters of the air interface 190 and collectively specify how a transmission is to be made and/or received by the air interface 190. The air interface manger 300 could also, or instead, define the parameters of the SL air interface 180 and specify how a transmission is to be made and/or received by the SL air interface 180

The components of the air interface manger 300 include at least one of a waveform component 305, a frame structure component 310, a multiple access scheme component 315, a protocol component 320 and a modulation and coding component 325.

The waveform component 305 may specify a shape and form of a signal being transmitted. Waveform options may include orthogonal multiple access waveforms and non-orthogonal multiple access waveforms. Non-limiting examples of such waveform options include Single-Carrier (SC), Ultra-Wideband (UWB), Frequency Modulated Continuous Wave (FMCW), Linear Frequency Modulated (LFM), OFDM, SC-FDMA, Filtered OFDM (f-OFDM), Time windowing OFDM, Filter Bank Multicarrier (FBMC), Universal Filtered Multicarrier (UFMC), Generalized Frequency Division Multiplexing (GFDM), Wavelet Packet Modulation (WPM), Faster Than Nyquist (FTN) Waveform and low Peak-to-Average Power Ratio Waveform (low PAPR WF). In some embodiments, a combination of waveform options is possible. A LFM-OFDM waveform is a non-limiting example of such a combination.

The frame structure component 310 may specify a configuration of a frame or group of frames. The frame structure component 310 may indicate one or more of a time, frequency, pilot signature, code, or other parameter of the frame or group of frames.

Non-limiting examples of frame structure options include: the number of symbols in the time slot, the number of time slots in the frame and the duration of each time slot (sometimes known as a transmission time interval, TTI, or a transmission time unit, TTU). The frame structure component may also specify whether the time slot is a configurable multi-level TTI, a fixed TTI, or a configurable single-level TTI. The frame structure component may further specify a co-existence mechanism for different frame structure configurations.

For some waveforms, such as certain OFDM-based waveforms, the frame structure component may also specify one or more associated waveform parameters, such as subcarrier spacing width, symbol duration, cyclic prefix (CP) length, channel bandwidth, guard bands/subcarriers, and sampling size and frequency.

Additionally, the frame structure component 310 may further specify whether the frame structure is used in a time-division duplex communication or a frequency-division duplex communication.

Additionally, the frame structure component 310 may further specify the transmission state and/or direction for each symbol in a frame. For example, each symbol may independently be configured as a downlink symbol, an uplink symbol, or a flexible symbol.

Together, the specifications of the waveform component and the frame structure component are sometimes known as the "numerology." Thus, the air interface 190 may include a numerology component 330 defining a number of air interface configuration parameters, such as the subcarrier spacing, CP length, symbol length, slot length and symbols per slot.

These numerologies, also known as subcarrier spacing configurations, may be scalable in the sense that subcarrier spacings of different numerologies are multiples of each other, and time slot lengths of different numerologies are also multiples of each other. Such a scalable design across multiple numerologies provides implementation benefits, for example scalable total OFDM symbol duration in a time division duplex (TDD) context.

Frames can be configured using a single scalable numerology or a combination of scalable numerologies. For example, a numerology with 60 kHz subcarrier spacing has a relatively short OFDM symbol duration (because OFDM symbol duration varies inversely with subcarrier spacing), which makes the 60 kHz numerology particularly suitable for ultra-low latency communications, such as Vehicle-to-Any (V2X) communications. A further example of a numerology with a relatively short OFDM symbol duration suitable for low latency communications is a numerology with 30 kHz subcarrier spacing. A numerology with 15 kHz subcarrier spacing may be compatible with LTE. A numerology with 15 kHz subcarrier spacing may serve as a default numerology for initial access of a device to a network. This 15 kHz numerology may also be suitable for broadband services. A numerology with 7.5 kHz spacing, which has a relatively long OFDM symbol duration, may be particularly useful for coverage enhancement and broadcasting. Additional uses for these numerologies will be or become apparent to persons of ordinary skill in the art. Of the four numerologies listed, those with 30 kHz and 60 kHz subcarrier spacings are more robust to Doppler spreading (fast moving conditions), because of the wider subcarrier spacing. It is further contemplated that different numerologies may use different values for other physical layer parameters, such as the same subcarrier spacing and different cyclic prefix lengths. In addition, subcarrier spacing may depend on the operational frequency band. For example, the subcarrier spacing in millimeter wave frequencies may be higher than in lower frequencies.

It is further contemplated that other subcarrier spacings may be used, such as higher or lower subcarrier spacings. For example, other subcarrier spacings varying by a factor of $2^n$ include 120 kHz and 3.75 kHz.

In other examples, a more limited scalability may be implemented, in which two or more numerologies all have subcarrier spacings that are integer multiples of the smallest subcarrier spacing, without necessarily being related by a factor of $2^n$. Examples include 15 kHz, 30 kHz, 45 kHz, 60 kHz subcarrier spacings.

In still other examples, non-scalable subcarrier spacings may be used, which are not all integer multiples of the smallest subcarrier spacing, such as 15 kHz, 20 kHz, 30 kHz, 60 kHz.

OFDM-based signals can be employed to transmit a signal in which multiple numerologies coexist simultaneously. More specifically, multiple sub-band OFDM signals can be generated in parallel, each within a different sub-band, and each sub-band having a different subcarrier spacing (and more generally with a different numerology). The multiple sub-band signals are combined into a single signal for transmission, for example for downlink transmissions. Alternatively, the multiple sub-band signals may be transmitted from separate transmitters, for example for uplink transmissions from multiple EDs, which may be UEs.

The use of different numerologies can allow the air interface 190 to support coexistence of a diverse set of use cases having a wide range of Quality of Service (QoS) requirements, such as different levels of latency or reliability tolerance, as well as different bandwidth or signaling overhead requirements. In one example, the base station can signal, to the ED, an index representing a selected numerology, or a single parameter (e.g., subcarrier spacing) of the selected numerology. Based on this signaling, the ED may determine the parameters of the selected numerology from other information, such as a look-up table of candidate numerologies stored in memory.

Continuing with the components of the air interface 190, the multiple access scheme component 315 may specify how access to a channel is granted for one or more EDs. Non-limiting examples of multiple access technique options include technologies defining how EDs share a common physical channel, such as: TDMA; FDMA; CDMA; Space Division Multiple Access (SDMA); SC-FDMA; Low Density Signature Multicarrier Code Division Multiple Access (LDS-MC-CDMA); Non-Orthogonal Multiple Access (NOMA); Pattern Division Multiple Access (PDMA); Lattice Partition Multiple Access (LPMA); Resource Spread Multiple Access (RSMA); and Sparse Code Multiple Access (SCMA). Any of these multiple access technique options may be implemented using one or more of: scheduled access; non-scheduled access, also known as grant-free access or configured grant access; non-orthogonal multiple access; orthogonal multiple access, e.g., via a dedicated channel resource (i.e., no sharing between multiple EDs); contention-based shared channel resource; non-contention-based shared channel resource; and cognitive radio-based access.

The protocol component 320 may specify how a transmission and/or a re-transmission are to be made. Non-limiting examples of transmission and/or re-transmission mechanism options include those that specify a scheduled data pipe size and a signaling mechanism for transmission and/or re-transmission.

The modulation and coding component 325 may specify how information being transmitted may be encoded/decoded and modulated/demodulated for transmission/reception purposes. Coding may refer to methods of error detection and forward error correction. Non-limiting examples of coding options include turbo trellis codes, turbo product codes, fountain codes, low-density parity check codes, and polar codes. Modulation may refer, simply, to Quadrature Amplitude Modulation (QAM) specified by a complex constellation (including, for example, the modulation technique and order, e.g., 16QAM, 64QAM, etc.), or more specifically to various types of advanced modulation methods such as hierarchical modulation, multi-dimensional modulation and low PAPR modulation.

Because an air interface includes a plurality of components or building blocks and because each component may have a plurality of candidate technologies (also referred to herein as air interface capability options), the air interface manager 300 may configure and store a large number of different air interface profiles. Each air interface profile defines a respective set of air interface capability options.

For example, in each air interface profile defining a respective set of air interface capability options, an air interface capability option is selected for each of the component building blocks of the air interface. Each of the different air interface profiles may be targeted to meet a different set of transmission requirements, including transmission content, transmit condition, and receive condition.

According to the transmission requirements of a pair of communicating transmitting-receiving devices, one of the different air interface profiles that best meet the transmission requirements may be selected from the air interface manager 300 and used for communications between the pair of communicating transmitting-receiving devices.

In further embodiments, the air interface manager 300 may modify or update its components, profiles, or capability options. For example, the air interface manager 300 may replace the waveform component 305 and the frame structure component 310 with a single numerology component 330. Conversely, the air interface manager 300 may separate the modulation and coding component 325 into an individual coding component and an individual modulation component. Furthermore, the air interface manager 300 is configurable such that new soft air interface configuration components developed in the future should be able to be utilized.

The air interface manager 300 may also update certain components to modify the capability options of any given component. For example, the air interface manager 300 may update the modulation and coding component 325 to include higher-order modulation schemes.

By updating the stored components, the profiles and the candidate options, the air interface manager 300 can flexibly adapt to better accommodate diverse wireless traffic types and services. Modifying or updating the stored components, the profiles and the candidate options may allow the air interface manager 300 to provide suitable air interface profiles for traffic types or services other than those already contemplated for ultra-reliable low latency communications (URLLC), enhanced mobile broadband (eMBB), and massive machine-type communications (mMTC).

Figure 26:
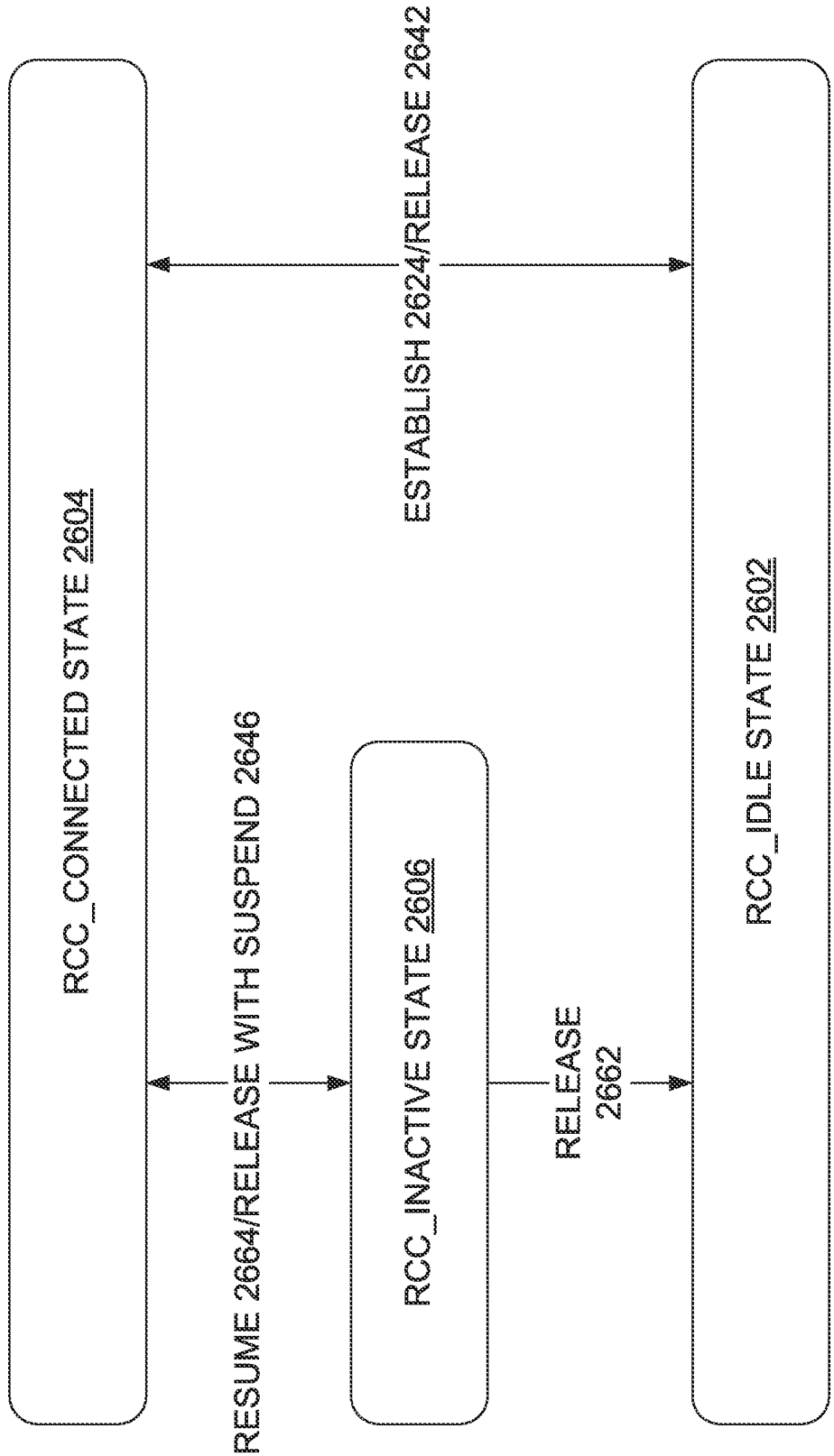
FIGS. 26 and 27 illustrate RRC states of a UE and indicate procedures used to transition between the states.

As noted above, in 3GPP New Radio (NR), a UE may operate in one of the following three states: the RRC_IDLE state 2602; the RRC_CONNECTED state 2604; and the RRC_INACTIVE state 2606 that were described in reference to FIG. 26.

The RRC_CONNECTED state 2604 is a non-limiting example of a connected or active state. A UE in the RRC_CONNECTED state 2604 is connected to the RAN 120 and to the core network (CN) 130. The UE could enter the RRC_CONNECTED state 2604 from the RRC_IDLE state 2602 following a connection establishment procedure or from the RRC_INACTIVE state 2606 following a connection resumption procedure, for example. The RRC_CONNECTED state 2604 can be characterized as including the following features: the UE stores the access stratum (AS) context; a transfer of unicast data to and from the UE is supported; at lower layers, the UE may be configured with UE-specific discontinuous reception (DRX); for UEs supporting carrier aggregation (CA), use of one or more secondary cells (SCells), aggregated with a special cell (SpCell), is supported for increased bandwidth; for UEs supporting dual connectivity (DC), use of a secondary cell group (SCG), aggregated with the master cell group (MCG), is supported for increased bandwidth; network controlled mobility is supported within a NR network and to/from an E-UTRA network; the UE monitors short messages transmitted with a paging radio network temporary identifier (P-RNTI) over downlink control information (DCI), if configured; the UE monitors control channels associated with the shared data channel to determine if data is scheduled for the UE; the UE provides channel quality and feedback information to the network; the UE performs neighboring cell measurements and measurement reporting; and the UE acquires system information.

The RRC_IDLE state 2602 is a non-limiting example of an idle or disconnected state. A UE in the RRC_IDLE state 2602 is not connected to the RAN 120 or the CN 130 and the UE may need to perform an initial access procedure to establish a connection to the network and transition to the RRC_CONNECTED state 2604. The RRC_IDLE state 2602 can be characterized as including the following features: UE-specific DRX may be configured by upper layers of the network; UE controlled mobility is based on network configuration; the UE monitors short messages transmitted with the P-RNTI over DCI; the UE monitors a paging channel for CN paging using a 5G system architecture evolution temporary mobile station identifier (5G-S-TMSI); the UE performs neighboring cell measurements and cell selection or cell reselection; and the UE acquires system information (SI) and can send a SI request, if configured.

The RRC_INACTIVE state is a non-limiting example of an inactive state. A UE in an inactive state uses fewer network resources and/or less power than a UE in a connected state. This may save battery life at the UE. When a UE transitions to the inactive state, configuration information for the UE is stored by the UE and the network. This allows the UE to return to the connected state relatively quickly and efficiently. For example, a UE may use less signaling to transition from an inactive state to a connected state than typical signaling used to transition from an idle state to a connected state.

The RRC_INACTIVE state could be considered to lie between the RRC_CONNECTED state and the RRC_IDLE state. In the RRC_INACTIVE state, at least a portion of the UE's AS context is stored by both the UE and the network, which allows the network to communicate with the UE. Therefore, secure and fast signaling could occur between the network and the UE. Moreover, a UE in the RRC_IDLE state might only support CN paging that is performed in the tracking area where the UE is located. In contrast, a UE in the RRC_INACTIVE state may, in addition to CN paging, also support RAN paging, which may be performed in the RAN notification area (RNA) where the UE is located. Because a RNA typically covers a smaller number of cells than is covered by a tracking area, RAN paging in the RRC_INACTIVE state may incur less DL resource consumption and/or overhead than incurred by CN paging.

The RRC_INACTIVE state can be characterized as including the following features: UE-specific DRX may be configured by upper layers of the network or by the RRC layer; UE controlled mobility is based on network configuration; the UE stores an inactive AS context, which could be different from the AS context used in the RRC_CONNECTED state; a RAN-based notification area is configured by the RRC layer; the UE monitors short messages transmitted with P-RNTI over DCI; the UE monitors a paging channel for CN paging using 5G-S-TMSI and RAN paging using a FullI-RNTI; the UE performs neighboring cell measurements and cell selection or cell reselection; the UE performs RAN-based notification area updates periodically and when moving outside the configured RAN-based notification area; and the UE acquires SI and can send an SI request, if configured.

The RRC_INACTIVE state is implemented in NR but, in general, an inactive state could be implemented in any wireless protocol or radio technology. Accordingly, inactive states are not limited to a particular wireless protocol or radio technology. Similar comments apply to idle states and connected states.

A UE 110 (see FIG. 1) can transition from a connected state to an inactive state using a suspend procedure and transition back to the connected state using a resume procedure. The UE 110 can also transition from the inactive state to the idle state using a release procedure. The transition from the connected state to the inactive state is invisible to the CN 130. Therefore, when the UE 110 is in the inactive state, UE-related signaling and data exchange can occur between the RAN 120 and the CN 130. From the perspective of the CN 130, the UE 110 in the inactive state is treated in a manner similar to the manner in which the UE 110 in the connected state is treated. For example, from the perspective of the CN 130, the UE 110 may have two connection management (CM) states. The UE 110 is either in a CM-CONNECTED state or a CM-IDLE state. When the UE 110 is in the CM-IDLE state from the perspective of the CN 130, the UE 110 is in the RRC_IDLE state from the RAN 120 point of view. Whereas, when the UE 110 is in the CM-CONNECTED state from the perspective of the CN 130, the UE 110 may be either in the RRC_CONNECTED state or the RRC_INACTIVE state from the RAN 120 point of view. The UE's security context and/or other portions of the UE's context is/are stored by the UE 110 and by the network before the UE 110 transitions from the connected state to the inactive state. Thus, the network can quickly and securely transmit signaling to the UE 110 for a transition from the inactive state to the connected or idle states.

Paging messages can be used by a network to facilitate a UE transition to a connected state from an idle state or from an inactive state. The paging messages can be received over a paging physical DL shared channel (paging PDSCH), for example. The network initiates a paging procedure by transmitting a paging message at a UE's paging occasion. The network may address multiple UEs 110 using a single paging message by including multiple UE identities (IDs) in a paging record that is carried by the paging message. A paging record is a set of UE IDs that correspond to UEs being paged by the network. In 3GPP NR Specification #TS38.331, an example of a paging record is the PagingRecord parameter and an example of a UE ID is the ue-Identity parameter.

In some embodiments, a UE in an idle or inactive state monitors a paging search space for a physical DL control channel (PDCCH) containing paging DCI. An example of paging DCI in NR is DCI format 1_0 having a cyclic redundancy check (CRC) that is scrambled or masked with the P-RNTI. 3GPP NR Specification #TS38.321 specifies P-RNTI (hexa-decimal) value to be 'FFFE'. UEs in an idle or inactive state know the P-RNTI and therefore these UEs are able to descramble or demask the CRC and use the CRC to check whether decoding of the DCI format 1_0 was successful. The DCI format 1_0 includes, among other information, either or both of a short message and scheduling information for a paging message. The scheduling information for the paging message could include a resource assignment with a frequency domain resource assignment, a time domain resource assignment, a virtual resource block (VRB)-to-physical resource block (PRB) mapping, a modulation and coding scheme (MCS), and/or transport block (TB) scaling. By way of example, DCI format 1_0 having a CRC scrambled by the P-RNTI could include any or all of the following bit fields: Short message indicator—2 bits in length; Short message—8 bits in length; Frequency domain resource assignment for a paging message $$-\left\lceil \log_2\left(\frac{N_{RB}^{DL,BWP}(N_{RB}^{DL,BWP}+1)}{2}\right)\right\rceil$$

bits in length, where $N_{RB}^{DL,BWP}$ could be equal to the size of the control resource set (CORESET) 0 (if only the short message is carried, then this bit field is reserved); Time domain resource assignment for the paging message—4 bits in length (if only the short message is carried, this bit field is reserved); VRB-to-PRB mapping for the paging message—1 bit in length (if only the short message is carried, this bit field is reserved); MCS for the paging message—5 bits in length (if only the short message is carried, this bit field is reserved); TB scaling for the paging message—2 bits in length (if only the short message is carried, this bit field is reserved); and Reserved bits—6 bits in length.

Throughout this disclosure, the terms "resource assignment" and "resource allocation" are equivalent and can be interchangeably used.

In the case that paging DCI contains a resource assignment for a paging message, a UE that receives the paging DCI proceeds to receive the scheduled paging message based on the resource assignment. When a given UE 110 in an idle state receives a paging message, the given UE 110 may determine if any of the UE IDs included in each paging record of the paging message match the particular ID allocated to the given UE 110 by upper layers of the network. In NR, 5G-S-TMSI is used as the UE ID for paging a UE 110 that is in the RRC_IDLE state. In the case that a UE ID in a paging record matches the particular ID of the given UE 110, then the given UE 110 may initiate a connection to the network, i.e., transition to a connected state, by forwarding the particular ID of the given UE 110 and an access type, if present, to the upper layers of the UE 110. An access type for a UE may be included as the accessType parameter in the paging message as specified in 3GPP NR Specification #TS38.331.

When a given UE 110 that is in an inactive state receives a paging message, the given UE may determine if the UE ID included in each paging record of the paging message matches the FullI-RNTI that the given UE 110 has stored. The FullI-RNTI is a 40-bit string that is configured to the given UE 110 during an RRC suspension procedure. For example, according to 3GPP NR Specification #TS38.331, the FullI-RNTI could be configured in the SuspendConfig field of a RRCRelease information element (IE), which is configured to the given UE 110 for suspension of the RRC connection and transition of the given UE 110 from the RRC_CONNECTED state to the RRC_INACTIVE state.

In the case that the UE ID included in a paging record matches the given UE's FullI-RNTI, then the given UE 110 may initiate an RRC connection resumption procedure. The RRC connection resumption procedure could depend on the access type configured for the given UE 110.

If the given UE 110 is configured by upper layers of the network with access identity 1, then the RRC connection resumption procedure may be set to multimedia priority service (MPS)—priority access. For example, according to 3GPP NR Specification #TS38.331, the resumeCause field may be set to mcs-PriorityAccess.

If the given UE 110 is configured by upper layers of the network with access identity 2, then the RRC connection resumption procedure may be set to mission critical service (MSC)—priority access. For example, according to 3GPP NR Specification #TS38.331, the resumeCause field may be set to msc-PriorityAccess.

If the given UE 110 is configured by upper layers of the network with any of access identities 11 to 15, then the RRC connection resumption procedure may be set to high priority access. For example, according to 3GPP NR Specification #TS38.331, the resumeCause field may be set to highPriorityAccess.

For other access identities, the RRC connection resumption procedure may be set to mobile terminated (MT) access. For example, according to 3GPP NR Specification #TS38.331, the resumeCause field may be set to mt-Access.

In the case that the UE ID included in a paging record does not match the given UE's FullI-RNTI, but instead matches another ID allocated to the given UE 110 by the network, then the given UE 110 may forward the UE's particular ID and an access type, if present, to the upper layers of the given UE 110. Upon going to the RRC_IDLE state, the given UE 110 may perform the actions specified in 3GPP NR Specification #TS38.331 with release cause set to "other." An example of the other ID allocated to the given UE 110 by upper layers of the network is the 5G-S-TMSI.

A UE in RRC_CONNECTED state monitors the PDCCH for DCI format 1_0 where the CRC of the DCI is scrambled by C-RNTI, and the value of the "Frequency domain resource assignment" field is all ones, as specified in 3GPP NR Specification #TS 38.212, section 7.3.1.2.1. This scenario is for random access procedure initiated by a PDCCH order, with all remaining fields set as follows:

Random Access Preamble index—6 bits according to ra-PreambleIndex in Subclause 5.1.2 of 3GPP NR Specification #TS 38.321.

UL/SUL indicator—1 bit. If the value of the "Random Access Preamble index" is not all zeros and if the UE is configured with supplementaryUplink in ServingCellConfig in the cell, this field indicates which UL carrier in the cell to use for transmitting the PRACH according to Table 7.3.1.1.1-1 of 3GPP NR Specification #TS 38.212; otherwise, this field is reserved.

SS/PBCH index—6 bits. If the value of the "Random Access Preamble index" is not all zeros, this field indicates the SS/PBCH that shall be used to determine the RACH occasion for the PRACH transmission; otherwise, this field is reserved.

PRACH Mask index—4 bits. If the value of the "Random Access Preamble index" is not all zeros, this field indicates the RACH occasion associated with the SS/PBCH indicated by "SS/PBCH index" for the PRACH transmission, according to Subclause 5.1.1 of 3GPP NR Specification #TS 38.321; otherwise, this field is reserved.

Reserved bits—10 bits

A UE in an RRC_INACTIVE state does not conventionally monitor the PDCCH for DCI format 1_0 where the CRC of the DCI is scrambled by C-RNTI.

Conventional control signaling mechanisms do not support (non-paging) DL data transmission to a UE or data transmission from a UE in an inactive state, except for transmissions that are done as part of a state transition procedure from an inactive to connected state. According to these conventional control signaling mechanisms, when a UE is in an inactive state and is not performing a procedure for connection resumption, the only DCI format that the UE monitors is the paging DCI. For example, the only DCI format that a UE in the RRC_INACTIVE state monitors is the DCI format 1_0 having a CRC scrambled by the P-RNTI. However, a conventional paging DCI does not support: non-paging DL data scheduling; notifications for non-paging DL data scheduling; SL data scheduling; or UL data scheduling.

Aspects of the present disclosure provide control signaling mechanisms to support transmission of reference signals from a UE in an inactive state. In particular examples, referring to FIG. 27, a UE 110 may operate in one of the three states illustrated in FIG. 27: an RRC_IDLE state 2602; an RRC_CONNECTED state 2604; and an RRC_INACTIVE state 2606 as described in FIG. 26, with the addition of a state transition REMAIN 2782. The REMAIN 2782 state transition refers to a UE in RRC_INACTIVE state 2606 performing one or more actions and remaining in the same RRC_INACTIVE state 2606. These one or more actions may, for example, be actions typically associated with a different RRC state, such as the RRC_CONNECTED state 2604. It should be observed that the origin/initial/beginning/starting state and final/ending/finishing state remain the same, i.e., the UE 110 does not change RRC states although certain actions have been performed by the UE 110. Some examples of actions performed by UE 110 can be envisioned as update/modification/change of UE 110 configurations, start a timer, end an existing timer, transmission such as SRS or preamble or both, etc. Such actions may be triggered by the base station 170 direct signaling, configuration, instruction or by the base station 170 indirectly through a prior configuration, signaling or instruction. Direct signaling, configuration, instruction may include the methods described in this application or configuring a timer, etc. Prior configuration, signaling or instruction may include UE 110 receiving configuration, signaling or instruction, for example, when the UE 110 is in the RRC_CONNECTED state 2604 (prior to transitioning to the RRC_INACTIVE state 2606 via the release with suspend procedure 2646). Prior configuration, signaling or instruction may include the UE 110 activating a timer that is valid in the RRC_INACTIVE state 2606. The timer may have been started and/or configured in an RRC state other than the RRC_INACTIVE state 2606. Such actions may be triggered by the UE 110 itself. Similarly, the idea of remaining in the same state can be considered for other RRC states as well. For example, an additional or alternative REMAIN state transition (not shown in FIG. 27) may define, while UE is in the RRC_IDLE state 2602, performing certain actions and remaining in the same RRC_IDLE state 2602.

Figure 27:
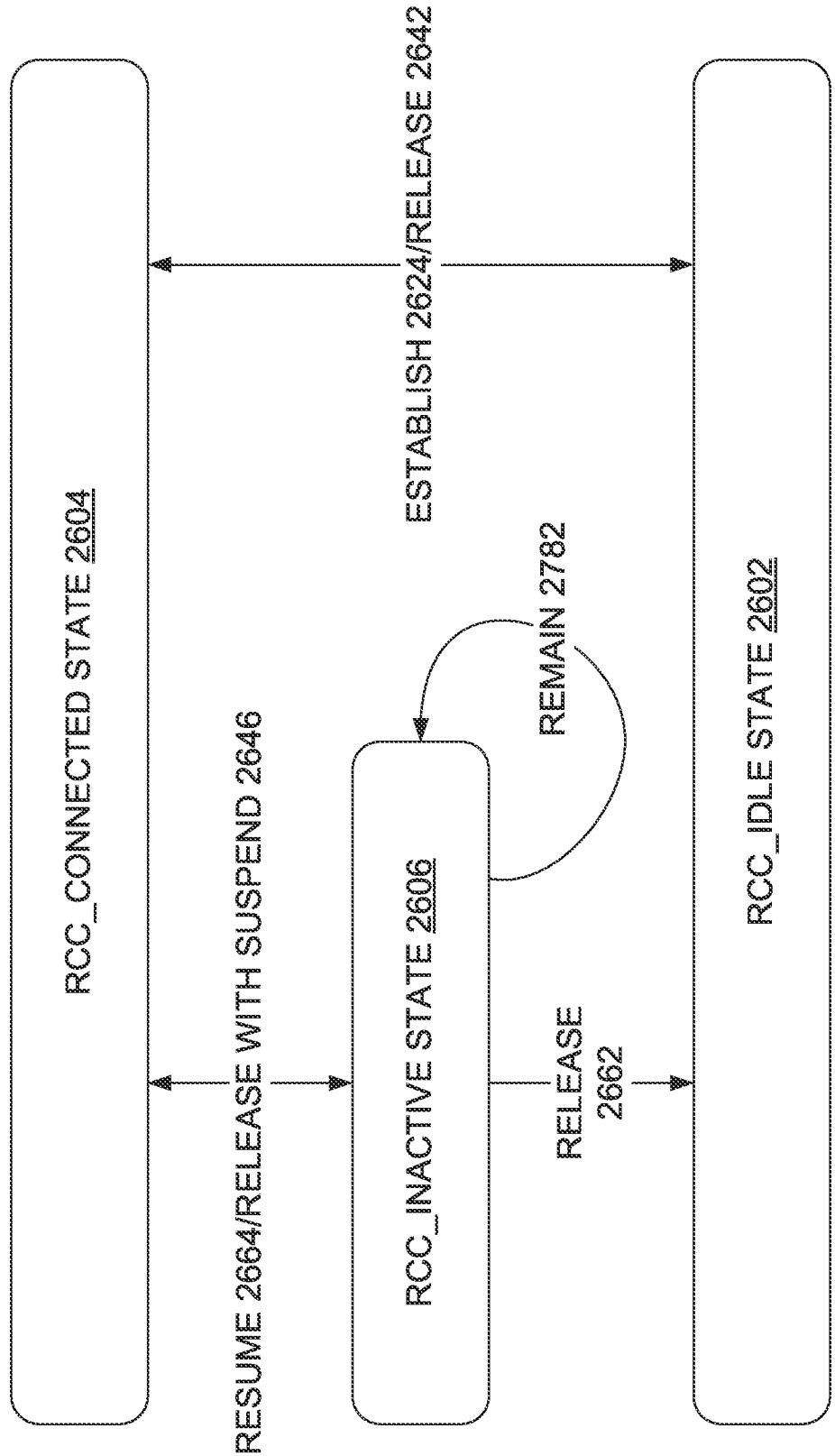

Referring still to FIG. 27, in some embodiments of this application, the UE 110 receives an instruction from the base station 170, the instruction indicating the UE 110 to perform certain actions and also to remain in the same RRC state. In some embodiments, the UE 110 receives an instruction from the base station 170, the instruction indicating the UE 110 to perform certain actions and also to refrain from/avoid changing its RRC state. Some examples of actions performed by the UE 110 can be envisioned as update/modification/change of the UE 110 configurations, start a timer, end an existing timer, transmission such as SRS or preamble or both, etc. The indication to the UE 110 to remain in the same RRC state or to avoid transitioning to other RRC states can be indicated in various ways. In an example, that the particular action(s) performed by the UE 110 imply that the RRC state should remain the same or not changed. In another example, the instruction, such as paging DCI (i.e., DCI 1_0 with CRC scrambled with P-RNTI), configures parameter(s) associated with SRS or preamble or BWP or numerology or combinations thereof, etc., and the UE subsequently remains in the same RRC state. In another example, the instruction such as UE specific or group specific DCI (e.g., I-RNTI described herein) configures parameter(s) associated with SRS or preamble or BWP or numerology or combinations thereof, etc., and the UE subsequently remains in the same RRC state. In another example, the UE performs action(s) such as SRS transmission, or preamble transmission, or both SRS and preamble transmission; and the UE is subsequently expected to remain in the same RRC state. In another example indication, the UE configures parameter(s) associated with SRS or preamble or BWP or numerology or combinations thereof, etc.; and performs action(s) such as SRS transmission or preamble transmission or both SRS and preamble transmission; and the UE is subsequently expected to remain in the same RRC state. The embodiments described in the application support, for the UE 110, receiving one or more instruction(s) for configuration(s), performing action(s), or both.

Data transmission (grant-free or grant-based) by a UE 110 that is in the RRC_INACTIVE state, without transitioning to the RRC_CONNECTED state, is discussed in U.S. patent application Ser. No. 16/664,302, filed Oct. 25, 2019 and in U.S. patent application Ser. No. 16/664,340, also filed Oct. 25, 2019. In the referenced applications, a unicast or a multicast data transmission may be scheduled to or from a given UE 110 that is in an inactive state using DCI and an ID that is specific to the given UE 110, or to a group of UEs including at least the given UE 110.

To improve the operation of the data transmissions scheduled to or from the given UE 110, it is preferred that a base station 170 can use a form of compensation to account for a distance between the given UE 110 and the base station 170. One such form of compensation may be realized as a timing advance (TA) value. Typically, the base station 170 determines the TA value by "TA estimation" based on an uplink transmission.

The existing mechanism for TA estimation is an initial access procedure. In the initial access procedure, the UE 110 transitions to the RRC_CONNECTED state from the RRC_INACTIVE state or the RRC_IDLE state. The initial access procedure is used for many scenarios. Such scenarios may include, for example, RRC Connection re-establishment procedure, transition from the RRC_INACTIVE state to the RRC_CONNECTED state, beam failure recovery, etc. For a Contention-Based Random Access (CBRA) Channel, the manner by which the UE 110 transitions to the RRC_CONNECTED state from the RRC_IDLE state or the RRC_INACTIVE state is illustrated in FIG. 4 (see, also, 3GPP NR Specification #TS38.300, section 9.2.6).

Figure 4:
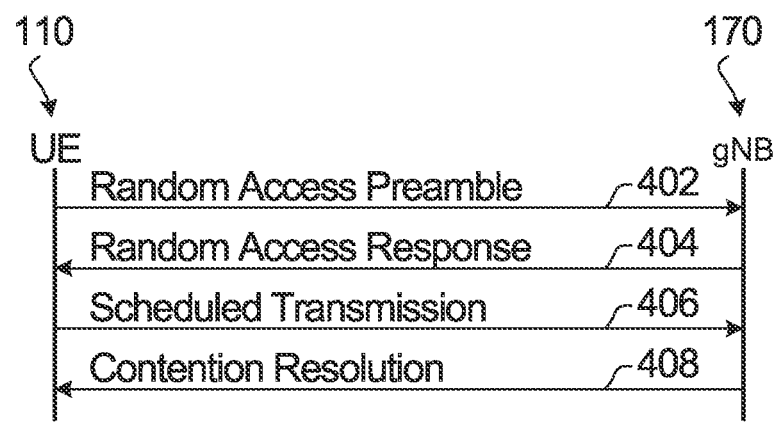
FIG. 4 illustrates known contention based random access (CBRA) signaling between a base station and a UE in an inactive state.

In FIG. 4, the UE 110 transmits, on a Random Access channel (RACH), a Preamble 402 to a gNB (a base station 170 in 5G NR). A preamble is a sequence that is generated, by the UE 110, according to a specific format. The gNB 170 employs the receipt of the preamble to determine a TA estimate. The gNB responds to receipt of the preamble 402 with a Random Access Response 404 including a schedule for an uplink transmission along with an indication of the TA estimate. The UE 110 transitions to the RRC_CONNECTED state and transmits a scheduled transmission 406 to the gNB 170. The gNB 170 responds with a Contention Resolution message 408.

For the purpose of uplink communications, the base station 170 should perform a TA estimation. On one hand, the base station 170 may use a last known TA estimate, that is, the TA estimate that was in place when the UE 110 was last in the RRC_CONNECTED state. It would be straightforward to transition the UE 110 to the RRC_CONNECTED state to obtain an up-to-date TA estimate. However, only a limited number of UEs should be in RRC_CONNECTED state at a given time to keep complexity of operations carried out at the scheduler 253 (see FIG. 2B) at a reasonable level and to lower the system resource utilization. Furthermore, the last known TA estimate is likely to be outdated, due to mobility and channel variations during a period of inactivity. Estimating TA in RRC_INACTIVE state is a key enabler for various use cases. Such use cases include grant-free data transmission in RRC_INACTIVE state and grant-based data transmission in RRC_INACTIVE state.

An existing mechanism for determining a TA estimate is part of an initial access procedure. As part of a typical initial access procedure, discussed in conjunction with a description of FIG. 4, the UE 110 transitions to RRC_CONNECTED state 2604 from the RRC_INACTIVE state 2606 or from the RRC_IDLE state 2602. The initial access process is used for many scenarios. Example scenarios include: an RRC Connection re-establishment scenario; a scenario involving a transition from RRC_INACTIVE state to RRC_CONNECTED state; and a beam failure recovery scenario, etc.

Figure 5:
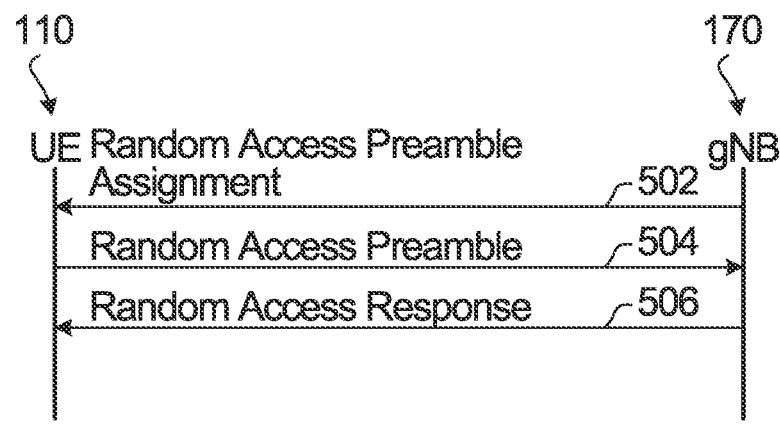
FIG. 5 illustrates known contention free random access (CFRA) signaling between a base station and a UE in a connected state.

For a Contention-Free Random Access (CFRA) Channel, TA estimation is a procedure carried out when the UE 110 is in the RRC_CONNECTED state 2604. In particular, the gNB 170 may determine a TA estimate upon synchronous reconfiguration, which may occur, e.g., during a handover. FIG. 5 illustrates a signaling diagram involving the gNB 170 signaling the UE 110 while the UE 110 is in the RRC_CONNECTED state 2604.

As illustrated in FIG. 5, the UE 110 receives a Random Access Preamble Assignment 502 from the gNB 170. The UE 110 transmits, to the gNB 170, a preamble 504, according to the details provided in the assignment. The gNB 170 replies with a response message 506.

A preamble, such as the preamble 402 of FIG. 4 or the preamble 504 of FIG. 5, may be generated as a Zadoff-Chu sequence. In generating the preamble, several parameters are input, including, but not limited to:

a sequence length parameter, $L_{RA}$, which is known to be either 139 or 839;

a cyclic shift, $C_v$; and a sequence number, u.

The preamble, when represented as a time domain sequence, $x_{u,v}(n)$, may be given as $$x_{u,v}(n) = x_u((n + C_v) \mod L_{RA})$$

where, $$x_u(i) = e^{-j\frac{\pi u i(i+1)}{L_{RA}}}, i = 0, 1, \ldots, L_{RA} - 1.$$

The preamble, when represented in the frequency domain as $y_{u,v}(n)$, may $$y_{u,v}(n) = \sum_{m=0}^{L_{RA}-1} x_{u,v}(n) \cdot e^{-j\frac{2\pi mn}{L_{RA}}}.$$

be given by

A pool of 64 preambles are defined, first by increasing the cyclic shifts of a logical root sequence, and then, by increasing the order of the logical root sequence index starting with the index obtained from higher layer parameter prach-RootSequenceIndex.

There may be cases in which 64 preambles cannot be generated from a single root Zadoff-Chu sequence. In such cases, additional preamble sequences may be obtained from the root sequences with the consecutive logical indices until all the 64 sequences are found.

There are typically 64 preambles defined in each time-frequency physical RACH (PRACH) occasion, enumerated in increasing order of first increasing cyclic shift $C_v$ of a logical root sequence and, then, in increasing order of the logical root sequence index, starting with the index obtained from the higher-layer parameter prach-RootSequenceIndex. Additional preamble sequences, in case 64 preambles cannot be generated from a single root Zadoff-Chu sequence, are obtained from the root sequences with the consecutive logical indices until all the 64 sequences are found. The logical root sequence order is cyclic; the logical index 0 is consecutive to 837 when $L_{RA}=839$ and is consecutive to 137 when $L_{RA}=139$.

The parameter prach-RootSequenceIndex is in the RACH-ConfigCommon Information Element (IE), which specifies the cell specific random-access parameters (see 3GPP NR Specification #TS 38.331).

In a preamble sequence, a single CP may be inserted for several consecutive symbols. A guard period (symbol time) may be defined. The guard period may be an unused portion of symbol time. In other words, transmission requires less time than assigned/allocated time period for the transmission. Alternatively, if the transmission time duration is the same as the allocated time for the transmission, the guard time is considered or said to be zero or non-existent. In a typical transmission scenario, the transmission duration is the same as the allocated time period. This is because, when the transmission is synchronous in time, the transmitter adjusts the time at which it transmits so that the signal arrives at the receiver within an expected time period. In case the transmitter does not use the proper timing for its own transmission, it may happen that signals from different transmitters are received at different times, causing undesired levels of interference to each other or to other signals. Such situation may happen due to non-synchronous transmission or asynchronous transmission. Guard time may reduce the interference caused by such timing uncertainty of the transmitter compared to the other transmissions sharing the physical resources. Physical resource may refer to time, frequency, antenna, beam, resource element (RE), symbol (s), sub-carrier(s), resource block(s) (RB(s)), slot(s), sub-slot(s), sub-frame(s), frame(s) etc. The time uncertainty may happen due to TA estimation errors, issues related to the hardware components such as local oscillator, uncertainty in a distance between the UE 110 and the base station 170, among others. A transmission in the presence of timing uncertainty between a transmitter and receiver may be referred as asynchronous transmission. As such, guard time provide a way to mitigate the effects of time mismatch, time uncertainty, TA estimation errors, etc. The guard time allows to mitigate the interference due to transmission m is-alignment in time and hence to design robust systems or to improve system performance.

In 5G NR Rel-15, a Sounding Reference Signal (SRS) is defined. Typically, an SRS is transmitted, by the UE 110, while the UE 110 is in RRC_CONNECTED state 2604. The format of the transmitted SRS transmission is configured by RRC signaling, specifically, in an SRS-Config IE. The SRS transmissions can be periodic, aperiodic or semi-persistent and transmitted in an active UL Bandwidth Part (BWP) while the UE 110 is in the RRC_CONNECTED state 2604. Different types of SRS transmissions are triggered in distinct manners. An Aperiodic type of SRS transmission may be triggered by receipt of a DCI (Formats 0_1, 1_1, 2_3), and is only transmitted once per trigger event. A semi-persistent SRS transmission may be triggered by receipt of control signaling, such as a Media Access Control (MAC) Control Element (CE) (MAC-CE), and may be deactivated by MAC-CE.

Information about SRS sequence generation is provided in 3GPP NR Specification #TS 38.211, section 6.4.1.4. A SRS sequence generation procedure takes, as input from an SRS-Config IE, various RRC configuration parameters, such as: a cyclic shift, $\alpha_i$; a number of consecutive OFDM symbols; an antenna port number, $p_i$; a transmission comb value, $K_{Tc}$, such that $\delta = \log_2 K_{Tc}$; a sequence group, $u \in \{0, \ldots, 29\}$; and a sequence number $v \in \{0,1\}$.

An SRS sequence, represented as $r_{u,v}^{(\alpha,\delta)}(n)$ may be considered to be a cyclic shift of a base sequence represented as $\bar{r}_{u,v}(n)$. That is, $$r_{u,v}^{(\alpha,\delta)}(n) = e^{j\alpha n}\bar{r}_{u,v}(n), \quad 0 \le n \le M_{ZC}.$$

An SRS sequence is generated by a UE 110 based on the configuration parameters. A single sequence or multiple sequences may be used for SRS transmission including SRS sequence or group hopping.

It may be considered that an SRS transmission is suitable when the UE 110 is uplink synchronous. Notably, an SRS that is transmitted within the last six symbols of a slot may interfere with other transmissions, such as a physical UL shared channel (PUSCH) and other SRS symbols in those cases wherein the uplink is not synchronized. Because it is a synchronous transmission, transmission aspects such as comb-based multiplexing, frequency hopping, etc., are supported. Compared with the preamble transmission discussed hereinbefore, an SRS transmission is shorter in length and is transmitted using the same numerology as the UL BWP. Therefore, SRS may be considered to be a low-overhead scheme for use in a cell with a smaller than typical cell radius. However, if a TA estimate is determined after receipt of an SRS transmission by the gNB, such an estimate may not be considered to be as accurate a TA estimate determined after receipt of a preamble. This is because TA estimation is not a key performance metric used in SRS design.

The problem with determining a TA estimate in the CBRA context is the high overhead associated with the initial access procedure and the UE 110 does not remain in the RRC_INACTIVE state 2606.

The problem with determining a TA estimate in the CFRA context is that the UE 110 is required to be in the RRC_CONNECTED state 2604.

When a UE 110 is in RRC_INACTIVE state 2606 (and is not performing the procedure for connection resumption or, in general, performing a procedure related to RRC state transitioning), the only DCI format the UE 110 will monitor is the DCI 1_0 format with CRC scrambled with P-RNTI. Therefore, a UE 110 in the RRC_INACTIVE state 2606 does not have mechanisms for adjustment/re-configuration of transmission parameters and the support of adequate behavior and procedure for such mechanisms. Notably, uplink synchronization and TA adjustment are functions particularly useful for arranging small data transmissions while the UE 110 is in the RRC_INACTIVE state 2606. Unfortunately, mechanisms for TA adjustment are not supported without the UE 110 transitioning to other RRC states. Situations wherein a UE 110 is uplink unsynchronized, for example, due to a long period of inactivity and mobility, are common while the UE 110 is in the RRC_INACTIVE state 2606. Furthermore, updating an existing configuration, adjusting the existing configuration or otherwise implementing changes to the existing configuration while the UE 110 is in the RRC_INACTIVE state 2606 are not supported. For example, triggering SRS transmission and/or preamble transmission or switching between preamble transmission and/or SRS transmission are not supported. Another example is that the timing details of SRS transmission and/or preamble transmission with respect to configured parameters cannot be updated, changed or otherwise reconfigured.

Aspects of the present application relate to mechanisms for enabling TA estimation, which mechanisms are not burdened with high overhead and which allow the UE 110 to remain in the RRC_INACTIVE state 2606. Indeed, a UE 110 may receive an instruction and, responsive to that instruction, the UE 110 may transmit an SRS transmission or a preamble transmission or both while in the RRC_INACTIVE state 2606. Further aspects relate to updating a configuration of a reference signal transmission, switching between reference signal transmissions, activating reference signal transmission, deactivating reference signal transmissions and specifying a time at which reference signal transmissions may be triggered.

In overview, one mechanism that may be suitable for providing an instruction to the UE 110 involves the known paging procedure.

According to 3GPP NR Specification #TS38.331 v15.6.0, a network element initiates a paging procedure by transmitting a paging message at a paging occasion specific to a UE 110, as specified in 3GPP NR Specification #TS 38.304. According to 3GPP NR Specification #TS 38.331 v15.6.0, the paging message in NR Rel-15 has fields as illustrated in a paging message 600 in FIG. 6. The network element may address multiple UEs 110 within a single paging message by including one PagingRecord for each UE 110. Upon receiving the paging message, the UE 110 shall:

1> if in RRC_IDLE, for each PagingRecord, if any, included in the Paging message:
    2> if the ue-Identity included in the PagingRecord matches the UE identity allocated by upper layers:
        3> forward the ue-Identity and the accessType (if present) to the upper layers;
1> if in RRC_INACTIVE, for each PagingRecord, if any, included in the Paging message:
    2> if the ue-Identity included in the PagingRecord matches the UE's stored full)-RNTI:
        3> if the UE is configured by upper layers with Access Identity 1:
            4> initiate the RRC connection resumption procedure according to 5.3.13 with resumeCause set to mps-PriorityAccess;
        3> else if the UE is configured by upper layers with Access Identity 2:
            4> initiate the RRC connection resumption procedure according to 5.3.13 with resumeCause set to mcs-PriorityAccess;
        3> else if the UE is configured by upper layers with one or more Access Identities equal to 11-15:
            4> initiate the RRC connection resumption procedure according to 5.3.13 with resumeCause set to highPriorityAccess;
        3> else:
            4> initiate the RRC connection resumption procedure according to 5.3.13 with resumeCause set to mt-Access;
    2> else if the ue-Identity included in the PagingRecord matches the UE identity allocated by upper layers:
        3> forward the ue-Identity to upper layers and accessType (if present) to the upper layers;
        3> perform the actions upon going to RRC_IDLE as specified in 5.3.11 with release cause 'other'.

In 3GPP NR, the UE 110 monitors the paging search space for a Physical Downlink Control Channel (PDCCH) containing a paging DCI (i.e., a DCI 1_0 with CRC scrambled with P-RNTI). The DCI 1_0 with CRC scrambled with P-RNTI contains, among other information, a short message, scheduling information for paging or both a short message and scheduling information for paging. If the DCI 1_0 with CRC scrambled with P-RNTI contains scheduling information for paging, a given UE 110, in the RRC_IDLE state 2602 or the RRC_INACTIVE state 2606, proceeds, after decoding the DCI, with receiving the scheduled paging message and, if the identity of the given UE 110 is included in the paging message, the given UE 110 follows the procedure specified in 3GPP NR Specification #TS38.331.

An aspect of the present application is related to paging-based parameter reconfiguration while the UE 110 is in the RRC_INACTIVE state 2606. The parameter reconfiguration may be accomplished using a paging message or a paging DCI for a group of UEs 110. To trigger the reconfiguration, specific bit fields of a DCI format 1_0 with CRC scrambled by P-RNTI may be defined. For example, contents of the specific bit fields of the DCI may trigger switching between preamble transmission and SRS transmission. There may be a specific set of parameters desired to be used for the preamble transmission and/or used for the SRS transmission. The specific set of parameters may, in one example, be signaled in a paging message. The specific set of parameters may, in another example, be signaled in a paging DCI. The specific set of parameters may, in a further example, be configured/preconfigured by higher layers during times when the UE 110 is in the RRC_CONNECTED state 2604.

In aspects of the present application, alterations to the DCI format 1_0 with CRC scrambled by P-RNTI are proposed so that the gNB 170 may employ the altered DCI format 1_0 with CRC scrambled by P-RNTI to cause the UE 110 to switch between preamble transmission and SRS transmission.

A given UE 110 in the RRC_INACTIVE state 2606, upon receipt of a paging DCI, may locate its own identity in the paging message 600 (see FIG. 6) that follows the paging DCI. In one example, the given UE 110 may find its own identity, such as a fullI-RNTI, as the PagingUE-Identity.

A table 700 of interpretations of the known two-bit "Short Message Indicator" DCI field is illustrated in FIG. 7 (see, also, 3GPP NR Specification #TS 38.212, Table 7.3.1.2.1-1). Notably, a bit field value "00" 702 is reserved.

Figure 8:
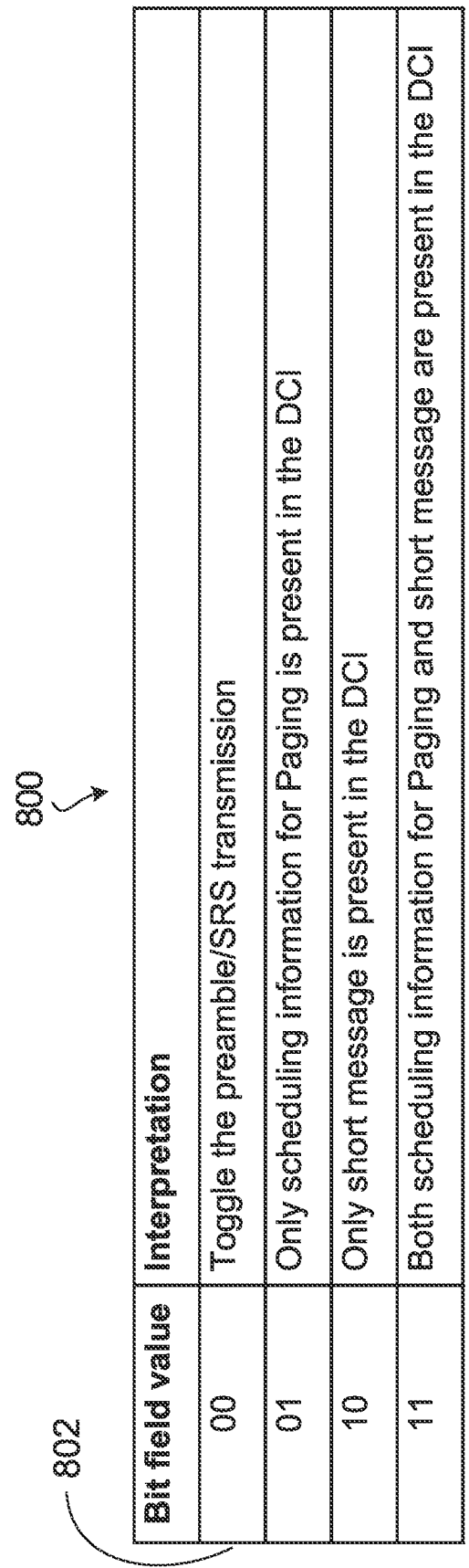
FIG. 8 illustrates a table of interpretations of a proposed two-bit "Short Message Indicator" DCI field.

A table 800 of interpretations of a proposed two-bit "Short Message Indicator" DCI field is illustrated in FIG. 8. As illustrated, a bit field value "00" 802 may be interpreted, by the UE 110, as a command to toggle from preamble transmission to SRS transmission or from SRS transmission to preamble transmission. This field interpretation may be RRC state specific. For example, a UE 110 in RRC_CONNECTED state 2604 may interpret a bit field value as reserved as illustrated in FIG. 7. However, a UE 110 in RRC_INACTIVE state 2606 or RRC_IDLE state 2602 may interpret the same bit field value as a specific instruction. It should be understood that the mapping of values to particular instructions is provided for an example only and that alternative mappings are also available.

So that the gNB 170 can anticipate the type of transmissions that will be received from the UE 110 after the gNB 170 transmits a command to toggle, the gNB 170 may rely upon an initial or default type of transmission having been signaled, to the UE 110, using RRC signaling. Alternatively, the gNB 170 may rely upon an agreed-upon initial or default type of transmission. For example, preamble transmission can be considered as an initial or default type of transmission. Alternatively, a default type transmission is configured during the release with suspend procedure 2646 or when the UE is in the RRC_CONNECTED state 2604. The initial type of transmission, indicated, signaled or agreed upon, is used for the configured transmission for the first time. The UE 110 maintains the transmission configuration to be used and updates the transmission configuration upon receiving new commands/signaling. The default type of transmission, indicated, signaled or agreed upon, is used unless the gNB 170 signals otherwise. For example, the preamble transmission may be the default transmission, by agreement. A UE 110 receiving a command to transmit an SRS transmission will transmit an SRS transmission; otherwise, the UE 110 will, by default, transmit a preamble transmission.

A table 900 of interpretations of the known eight-bit "Short Message" DCI field is illustrated in FIG. 9 (see, also, 3GPP NR Specification #TS 38.331, Table 6.5-1). Notably, bits 3-8 902 are not used in this release of the specification, and shall be ignored by UE if received.

A table 1000 of interpretations of a proposed eight-bit "Short Message" DCI field is illustrated in FIG. 10. As illustrated, any single bit out of bits 3-8 1002 may be interpreted, by the UE 110, as a command to toggle from preamble transmission to SRS transmission or from SRS transmission to preamble transmission. An instance wherein a single bit out of bits 3-8 1002 has the value "0" may be interpreted, by the UE 110, as a command to activate preamble transmission instead of SRS transmission or, if already configured for preamble transmission, to maintain the current configuration. Those instances wherein a single bit out of bits 3-8 1002 has any value other than "0" may be interpreted, by the UE 110, as a command to activate SRS transmission instead of preamble transmission or, if already configured for SRS transmission, to maintain the current configuration. As illustrated, any single bit out of bits 3-8 1002 may be interpreted, by the UE 110, as a command to activate preamble transmission or a command to activate SRS transmission. For example, if the received bit is set to 0, the UE 110 will interpret the bit as an indication of a command to activate preamble transmission and, otherwise, the UE 110 will interpret the bit as an indication of a command to activate SRS transmission.

Rather than using a single bit out of bits 3-8 1002, it is contemplated to use multiple bits out of the six bits 3-8 1002. For example, when bits 3-8 1002 have value "000000", this may be interpreted, by the UE 110, as a command to activate preamble transmission instead of SRS transmission or, if already configured for preamble transmission, to maintain the current configuration. Those instances wherein bits 3-8 1002 have any value other than "000000" may be interpreted, by the UE 110, as a command to activate SRS transmission instead of preamble transmission or, if already configured for SRS transmission, to maintain the current configuration.

Figure 11:
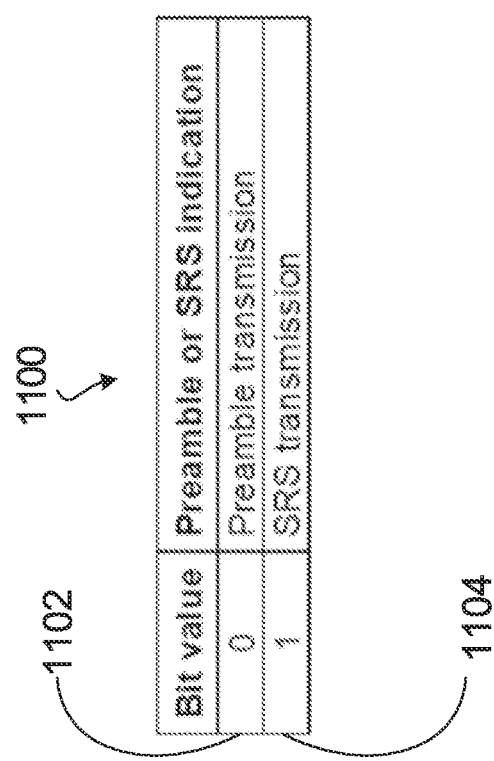
FIG. 11 illustrates a table of interpretations of a single bit indication within the "Short Message" DCI field.

A table 1100 of interpretations of a single bit indication within the "Short Message" DCI field is illustrated in FIG. 11. As illustrated, a zero value 1102 (or one value) for the single bit indication may be interpreted, by the UE 110, as a command to use preamble transmission. Additionally, a one value 1104 (or zero value) for the single bit indication may be interpreted, by the UE 110, as a command to use SRS transmission.

A table 1100 of interpretations of a single bit indication of a new DCI bit field is illustrated in FIG. 11. The new DCI bit field may be defined using one of the bits from the currently reserved bit field in the paging DCI. As illustrated, a zero value 1102 (or one value) for the single bit indication may be interpreted, by the UE 110, as a command to use preamble transmission. Additionally, a one value 1104 (or zero value) for the single bit indication may be interpreted, by the UE 110, as a command to use SRS transmission.

Configurations of parameters for preamble transmissions and/or SRS transmissions may be provided to the given UE 110 by RRC signaling prior to the given UE 110 entering into the RRC_INACTIVE state 2606, e.g., when the given UE 110 was in the RRC_CONNECTED state 2604 or during a time when the given UE 110 was carrying out an RRC suspension procedure.

As an alternative to using values embedded in DCI fields, the paging message may be used by the gNB 170 to command the UE 110 to use one of preamble transmission and SRS transmission.

FIG. 12 illustrates an adapted paging message 1200. Included within the PagingRecord of the adapted paging message 1200 is a new indication 1202, called preambleOrSRSIndication herein. The value of the new indication 1202 can either be "PREAMBLE" or "SRS". Similar to the example provided, the paging message may indicate the choice of "PREAMBLE" or "SRS" transmission, by a way of a field, a combination of few fields, directly or indirectly.

In aspects of the present application, the gNB 170 may use a paging message to signal, to the UE 110, parameters for preamble transmission or SRS transmission.

The known paging message 600 (see FIG. 6) includes an element called ue-Identity. The value of the element called ue-Identity is generically called PagingUE-Identity and is associated with reference numeral 602. The PagingUE-Identity 602 may take on one of several values, with labels such as PagingUE-Identity0, PagingUE-Identity1, etc.

FIG. 13A illustrates a table 1300A for mapping values of the PagingUE-Identity 602 to specific indices that provide references to configuration details for preamble transmissions, which configuration details are stored at the UE 110. In operation, the gNB 170 transmits the paging message 600 of FIG. 6 with an index referenced in the PagingUE-Identity 602 to thereby signal, to the UE 110, that the UE 110 should generate a preamble transmission using parameters specified in configuration details associated with the index.

FIG. 13B illustrates a table 1300B for mapping values of the PagingUE-Identity 602 to specific indices that provide references to configuration details for SRS transmissions, which configuration details are stored at the UE 110. In operation, the gNB 170 transmits the paging message 600 of FIG. 6 with an index referenced in the PagingUE-Identity 602 to thereby signal, to the UE 110, that the UE 110 should generate an SRS transmission using parameters specified in configuration details associated with the index.

In aspects of the present application, the gNB 170 may include, in a paging message, an index to signal, to the UE 110, parameters for preamble transmission or SRS transmission.

FIG. 14 illustrates an adapted paging message 1400. Included within the PagingRecord of the adapted paging message 1400 is a new indication 1402, called referenceSignalIndex herein. The value of the new indication 1402 is given, generically, as ReferenceSignalIndex herein.

In operation, the gNB 170 transmits the paging message 1400 of FIG. 14 with an index specified as the value of ReferenceSignalIndex to thereby signal, to the UE 110, that the UE 110 should generate a preamble transmission or an SRS transmission using parameters specified in configuration details associated with the index.

In one aspect, there may be one index for configuration of preamble transmissions and another index for configuration of SRS transmissions, as follows:

```
ReferenceSignalIndex ::=    CHOICE {
    preambleIndex               PreambleIndex,
    srsIndex                    SRSIndex,
    ...
}
```

In another aspect, there may be one index to reference configuration details for preamble transmissions and another index to reference configuration details for SRS transmissions, as follows:

referenceSignalIndex::=SRSorPreambleIndex

In one alternative, the SRSorPreambleIndex may take on one of 64 values (0, . . . , 63). In another alternative, the SRSorPreambleIndex may take on one of two values (0,1). In a further alternative, the SRSorPreambleIndex may take on one of M values, represented by a number of bits given by $\log_2(M)$.

FIG. 15 illustrates an adapted paging message 1500. The adapted paging message 1500 includes an element 1502, called PagingInactiveState herein, in place of a Paging element. The PagingInactiveState 1502 may be used to indicate that the information is intended for a UE 110 in the RRC_INACTIVE state 2606. Similarly, paging messages for different RRC states such as the RRC_IDLE state 2602 may be defined. Such RRC state specific paging messages may be processed by the UEs 110 in that RRC state. Alternatively, a paging message may be processed by UEs in multiple RRC states. For example, the paging message 1500 may be processed by UEs in both the RRC_INACTIVE state 2606 and the RRC_IDLE state 2602. In another example, a paging message PagingInactiveState 1502 may be processed by UEs 110 in both the RRC_INACTIVE state 2606 and the RRC_IDLE state 2602 but PagingIdleState (a new adapted paging message (not shown)) may be processed by UEs 110 in only the RRC_IDLE state 2602. The PagingInactiveState 1502 element includes an element 1504, called pagingRecordListInactive element herein, in place of a pagingRecordList element. The pagingRecordListInactive element 1504 includes an element 1506, called PagingRecordInactive element herein, in place of a PagingRecord element. Included within the PagingRecordInactive 1506 of the adapted paging message 1500 of FIG. 15 is the new indication 1402, called referenceSignalIndex, familiar from FIG. 14. The value of the new indication 1402 is given, generically, as a value called ReferenceSignalIndex herein.

The preceding discussion of FIGS. 13-15 makes reference to an index for SRS transmission (SRS index, see FIG. 13B) and for preamble transmissions (preamble index, see FIG. 13A). These indices may be used to refer to a specific sequence defined in a reference signal sequence pool. Such a reference signal sequence pool may be RRC state specific, for example, specific to the RRC_INACTIVE state 2606, or the reference signal sequence pool may be associated with a plurality of RRC states.

More particularly, there may be an SRS sequence pool for the RRC_INACTIVE state 2606 and a preamble sequence pool for the RRC_INACTIVE state 2602. The SRS index is the sequence index in the SRS sequence pool. The preamble index is the sequence index in the preamble sequence pool.

When specifying the parameters for sequence generation (e.g., SRS-Config IE) to be used in SRS sequence generation, group hopping and sequence hopping can be used. In addition, UE-specific cyclic shifts for a sequence can be assigned. It is known, in the current 5G NR, to assign different cyclic shifts to multiple antenna ports. To avoid complexities, SRS transmission while in the RRC_INACTIVE state 2606 may be restricted to a single antenna port.

For the gNB 170 to trigger the UE 110 to perform an SRS transmission, it is helpful to have an SRS sequence pool that is indexed. In a first option, there are N SRS sequences defined, enumerated in increasing order of cyclic shift, $\alpha_i$, of a sequence group $u \in \{0, \ldots, 29\}$ and a sequence number $v \in \{0,1\}$. In a second option, there are N SRS sequences defined, enumerated in increasing order of first increasing shift, $\alpha_i$, of a sequence group u and, then, in increasing order of the group u, starting with an index obtained from a higher-layer parameter, called srs-StartIndex $u_0$, which is a new parameter proposed herein for inclusion in the SRS-Config IE specifically for the RRC_INACTIVE state 2606. In a third option, there are N SRS sequences defined, enumerated in increasing order of first increasing shift, $\alpha_i$, of a sequence group u and, then, in increasing order of the sequence group u and, then, in increasing order of the sequence number v starting with an index obtained from higher-layer parameters srs-StartGroupindex, $u_0$, and srs-StartSequenceIndex, $v_0$, which are new parameters proposed herein for inclusion in the SRS-Config IE specifically for the RRC_INACTIVE state 2606. In a fourth option, defining indices for the SRS sequence pool for use in the RRC_INACTIVE state 2606 may involve using parameters already specified in the SRS-Config IE. An index to a specific SRS sequence may be made up of one or more parameters in the SRS-Config IE in addition to other parameters, for example, parameters such as the known SRS Resource Set ID, the known SRS Resource ID, etc. A table may be used to relate an index to an SRS sequence within the SRS sequence pool to the index defined using the known SRS parameters. Notably, the size of the SRS sequence pool can be 64 sequences, such that each SRS index may be represented using six bits. In general, the size of the SRS sequence pool may be N, such that each SRS index may be represented using $\log_2$ (N) bits.

For the gNB 170 to trigger the UE 110 to perform a preamble transmission, it is helpful to have a preamble sequence pool that is indexed. In a first option, the pool of preamble sequences is the same as the pool of preamble sequences used for the physical random access channel. In a second option, the pool of preamble sequences is a sub-set of the pool of preamble sequences used for the physical random access channel. Indices for the pool, of size N, of preamble sequences used when the UE 110 is in the RRC_INACTIVE state may be obtained by adding an index, i, to a UE-specific identifier, $UE_{ID}$, to arrive at a preamble sequence index given by $(i+UE_{ID})\mod N$. Notably, the index, i, in this case is an index of a preamble sequence in the pool of preamble sequences used for the physical random access channel. Additionally, the UE-specific identifier, $UE_{ID}$, may be an I-RNTI (defined herein) or an identifier signaled through RRC signaling. In a third option, RACH parameters specified in the known RACH-ConfigCommon IE, the known RACH-ConfigGeneric IE and the known RACH-ConfigDedicated IE may be combined to form an index to a preamble sequence in the preamble sequence pool. Still other RACH parameters may also be available, for example the known PRACH-ConfigurationIndex. A table may be used to relate an index to a preamble sequence within the preamble sequence pool to the index defined using the known RACH parameters. The preamble index may be formed from one or more RACH parameters in the known PRACH-ConfigurationIndex in the known RACH-ConfigGeneric IE and the known prach-RootSequenceIndex in the known RACH-ConfigCommon IE, etc. Notably, the size of the preamble sequence pool can be 64 sequences, such that each preamble index may be represented using six bits. In general, the size of the preamble sequence pool may be N, such that each preamble index may be represented using $\log_2$ (N) bits.

Further notably, mapping between preamble index or SRS index and paging message can be one-to-one, one-to-many or many-to-one. In one-to-one mapping, a UE receiving a paging message may use only one preamble index or one SRS index. In one-to-many mapping, a UE receiving a paging message may use several preamble indices or several SRS indices. In many-to-one mapping, multiple UEs receiving a paging message may use the same preamble index or SRS index. In different mapping scenarios, the transmission occasion may be utilized to distinguish the sequences in addition to the parameters of the sequences. Mapping can be functional, for example, index=mod($UE_{ID}$, pool size). Paging message fields, such as accessType/PagingRecord, may be a part of the mapping table, e.g., UE behavior or a mapped index may depend on or relate to a particular accessType/PagingRecord configuration.

Currently, each paging DCI and each paging message are received and processed by all UEs 110, including UEs 110 in the RRC_IDLE state 2602 and UEs 110 in the RRC_INACTIVE state 2606. This indiscriminate receiving may be associated with paging overhead and battery consumption, at all UEs 110, for processing paging messages and paging DC's that are not directed at all UEs 110. In aspects of the present application, paging message processing may be restricted/constrained to a specific group of UEs 110. Such aspects may be used as a singular paging enhancement or may be used in combination with aspects described hereinbefore.

Recall that table 700, illustrated in FIG. 7, provides interpretations of the known two-bit "Short Message Indicator" DCI field (see, also, 3GPP NR Specification #TS 38.212, Table 7.3.1.2.1-1). Notably, a bit field value "00" 702 is reserved.

Figure 16:
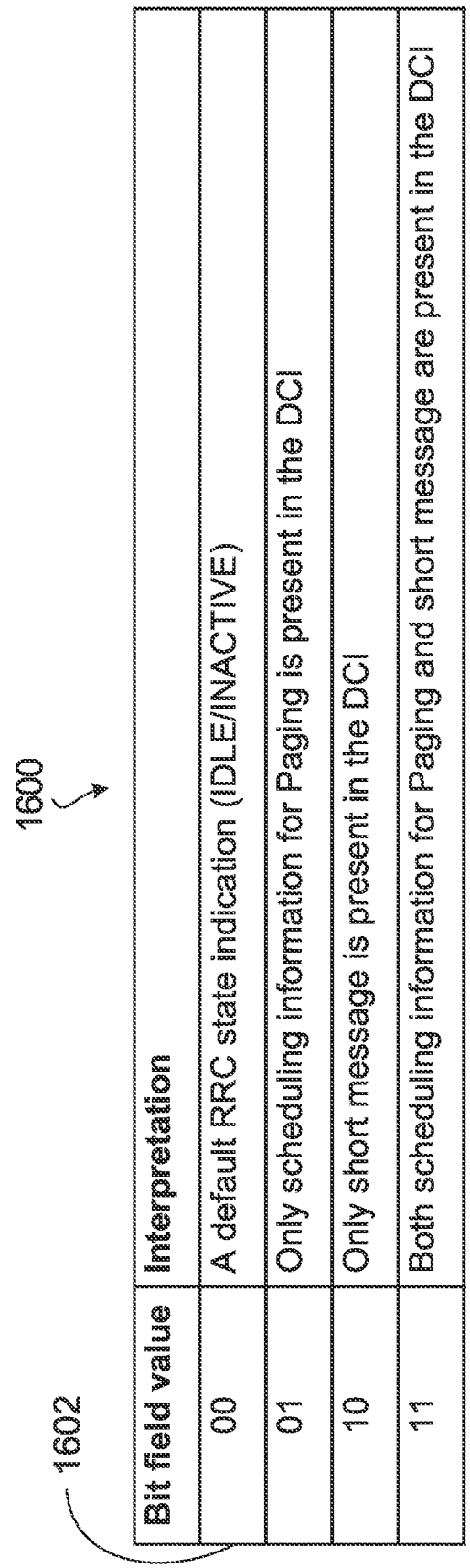
FIG. 16 illustrates a table of interpretations of a proposed two-bit "Short Message Indicator" DCI field.

In an aspect of the present application, a gNB 170 may use the reserved "00" bit field value to indicate that only UEs 110 that are in a default RRC state are targeted, as a group, for receipt of a subsequent paging message. A table 1600 of interpretations of a proposed two-bit "Short Message Indicator" DCI field is illustrated in FIG. 16. As illustrated, a bit field value "00" 1602 may be interpreted, by the UE 110, as a command to only process the subsequent paging message if the UE 110 is in the default RRC state.

In operation, the gNB 170 may include, in the "Short Message Indicator" DCI field, the bit field value "00" 1602 and, thereby, indicate that UEs 110 in the RRC_CONNECTED state 2604 are excluded from needing to process the subsequent paging message. Consequently, by including the bit field value "00" 1602, the gNB 170 indicates that UEs 110 in the RRC_IDLE state 2602 and the RRC_INACTIVE state 2606 are expected to process the subsequent paging message.

Recall that the table 900, illustrated in FIG. 9, provides interpretations of the known eight-bit "Short Message" DCI field (see, also, 3GPP NR Specification #TS 38.331, Table 6.5-1). Notably, bits 3-8 902 are not used. It should be understood that the mapping of values to particular indications is provided for an example only and that alternative mappings are also available.

A table 1700 of interpretations of a proposed eight-bit "Short Message" DCI field is illustrated in FIG. 17. As illustrated, bits 3-8 1702 may be interpreted, by the UE 110, as a command to process or ignore a subsequent paging message. An instance wherein the bits 3-8 1702 have value "000000" may be interpreted, by the UE 110, as a command to only process a subsequent paging message if the UE 110 is in the RRC_IDLE state. An instance wherein bits 3-8 1702 have any value other than "000000" may be interpreted, by the UE 110, as a command to only process a subsequent paging message if the UE 110 is in the RRC_INACTIVE state 2606. Clearly, not all six bits are needed to convey this binary distinction. As such, only a particular one of the bits 3-8 1702 might be used.

A table 1800 of interpretations of a proposed eight-bit "Short Message" DCI field is illustrated in FIG. 18. As illustrated, bits 3-8 1802 may be interpreted, by the UE 110, as a command to process or to ignore a subsequent paging message. The bits 3-8 1802 may be indicative of a six-bit group ID. An instance wherein bits 3-8 1802 have a particular six-bit value may be interpreted, by the UE 110, as a command to only process a subsequent paging message if the UE 110 is in the predefined group of UEs 110 associated with the group ID having the particular six-bit value. It may be that fewer than six bits are required to distinguish amongst group IDs. As such, only a particular subset of the bits 3-8 1802 may be used.

Notably, rather than being associated with specific UEs 110, the group ID may be associated with specific RCC states.

For one example of the use of the bits 3-8 1802, m of the six bits may be used to represent $2^m$ group IDs. One combination of the six bits 3-8 1802 (e.g., "00000") may be used to indicate, to the UEs 110, that the UEs 110 are to ignore the group indication, such that all UEs 100 process the paging message.

Many of the aspects of the present application described with reference to FIGS. 6-18 may be combined in practice.

In one example, the bit field value 00 802, illustrated in the table 800 of FIG. 8 (interpretations of the Short Message Indicator DCI field), may be used in combination with at least some of the bits 3-8 1802 in the table 1800 of FIG. 18 (the Short Message DCI field), which bits, as discussed hereinbefore, may be used to indicate a UE group ID.

Responsive to receiving a DCI indicating a UE group ID and an instruction to employ, activate or trigger preamble transmission and/or SRS transmission, the UE 110 may determine that the group ID corresponds to a group of UEs to which the UE 110 belongs. Upon such determining, the UE 110 may carry out the instructions and employ, activate or trigger preamble transmission and/or SRS transmission. Indeed, all UEs 110 in the UE group shall carry out the instructions and employ, activate or trigger preamble transmission and/or SRS transmission.

In another example, m of the bits 3-8 1802 in the table 1800 of FIG. 18 (the Short Message DCI field) may be used to indicate a UE group ID and one of the bits 3-8 1802 may be used to instruct the UEs 110 in the UE group to employ preamble transmission (if set to 0) or SRS transmission (if set to 1).

Responsive to receiving a DCI indicating a UE group ID and an instruction to employ preamble transmission, the UE 110 may determine that the group ID corresponds to a group of UEs to which the UE 110 belongs. Upon such determining, the UE 110 may carry out the instructions and employ preamble transmission. Indeed, all UEs 110 in the UE group shall carry out the instructions and employ preamble transmission.

As an alternative to the aspects of the present application described with reference to FIGS. 6-18, further aspects of the present application involve defining bit fields of a new DCI format 1_0 with a CRC scrambled by a new RNTI, i.e., not the P-RNTI used to scramble the CRC in accordance with the aspects of the present application that have been described with reference to FIGS. 6-18. As a result, a UE in RRC_INACTIVE state 2606 is expected to process DCI scrambled with a new RNTI (without limiting itself to DCI scrambled with P-RNTI). Notably, a UE may be configured to process DCI scrambled with P-RNTI only, or DCI scrambled with new RNTI only, or DCI scrambled with either one of P-RNTI and new RNTI. A UE in the RRC_INACTIVE state 2606 may process both the DCI scrambled with P-RNTI and new RNTI and execute such signaling.

The so-called new RNTI may also be called an "I-RNTI" and may be used to indicate (or "address") a single UE 110 or a group of UEs 110. The I-RNTI may be employed to signal parameters to a group of UEs 110. Conveniently, the signaling of parameters to a group of UEs 110 may be seen to make DCI messaging less frequent and reduce power consumed by UEs 110 for processing DCI messaging. Although a typical RNTI is 16 bits, the I-RNTI may be longer or shorter than 16 bits. Indeed, the greater the number of bits in the I-RNTI, the greater the number of UEs 110 that may be addressed.

The I-RNTI for a particular UE 110 may be configured when the particular UE 110 is in the RRC_CONNECTED state 2604. The particular UE 110 can be configured with an I-RNTI as part of an RRC connection setup. Alternatively, the particular UE 110 can be configured with an I-RNTI in a pdcch-ServingCellConfig IE. Further alternatively, the particular UE 110 can be configured with an I-RNTI in a PDCCH-Config IE as part of a DL BWP configuration.

The bits of the I-RNTI may be selected from the bits of the known 40-bit fullI-RNTI. Alternatively, the bits of the I-RNTI may be determined as a function of the known 40-bit fullI-RNTI. The 40-bit fullI-RNTI may be provided to the UE 110 during an RRC suspension procedure, for example in the SuspendConfig element of the RRCRelease IE.

The bits of the I-RNTI may be selected from the bits of the known 24-bit ShortI-RNTI. Alternatively, the bits of the I-RNTI may be determined as a function of the known 24-bit ShortI-RNTI. The 24-bit ShortI-RNTI may be provided to the UE 110 during an RRC suspension procedure, for example, in the SuspendConfig element of the RRCRelease IE.

The bits of the I-RNTI may be selected from the bits of the known 48-bit NG-5G-S-TMSI. Alternatively, the bits of the I-RNTI may be determined as a function of the known 48-bit 5G-S-TMSI. In the case of a 16-bit I-RNTI, the 16 bits can be the 16 Most Significant bits of the 5G-S-TMSI, the 16 Least Significant bits of the 5G-S-TMSI or 16 bits of 5G-S-TMSI selected based on a predefined selection pattern.

The bits of the I-RNTI may be selected based on the MAC identifier associated with the UE 110. Alternatively, the bits of the I-RNTI may be selected as a combination of the MAC identifier associated with the UE 110 and further information. The further information may be, for example, "network resource identifiers," "sleep cycle group information" or "paging cycle groups."

In the aspects of the present application related to a DCI format 1_0 with a CRC scrambled by the I-RNTI, there are at least 19 bit fields contemplated for the DCI. It should be appreciated that, although 19 bit fields are described for the purpose of explanation, in a given DCI format, several of the fields out of the 19 bit fields may be used, each field targeted for a specific purpose.

A bit field is contemplated for a reference signal ID.

In those cases wherein the DCI relates to a preamble transmission, the reference signal ID may be a six-bit field containing a random access preamble index. The preamble index may be a reference to one set of preamble configuration parameters in a pool of preamble configuration parameters.

In those cases wherein the DCI relates to an SRS transmission, the reference signal ID may include six bits containing an SRS Resource ID and four bits containing an SRS Resource Set ID.

In general, for either preamble transmission or SRS transmission, the reference signal ID may contain an index of length $\log_2 N$ bits as a reference to one set of configuration parameters in a pool of N configuration parameters.

A bit field is contemplated for a SRS or preamble indication.

That is, the DCI may have a single bit field for indicating whether the DCI relates to configuring a preamble transmission (bit value="0") or relates to configuring an SRS transmission (bit value="1").

A bit field is contemplated for a UL/SUL indicator.

In consideration of a case wherein the value of the random access preamble index is not all zeros and the UE 110 is configured with supplementaryUplink in the ServingCellConfig IE in the cell, a one-bit UL/SUL indicator field may be employed to indicate a UL carrier within the cell on which to transmit the PRACH according to 3GPP NR Specification #TS 38.212, Table 7.3.1.2.1-1. For other cases, the one-bit UL/SUL indicator field may be considered to be reserved.

A bit field is contemplated that is specific to preamble configurations.

The preamble configuration bit field may include a six-bit synchronization signal/physical broadcast channel (SS/PBCH) index and a four-bit PRACH Mask index.

In consideration of a case wherein the value of the random access preamble index is not all zeros, the SS/PBCH index may be employed, by the gNB 170, to indicate a particular SS/PBCH that is to be used, by the UE 110, to determine the RACH occasion for PRACH transmissions. For other cases, the six bits of the SS/PBCH index may be considered to be reserved.

In consideration of a case wherein the value of the random access preamble index is not all zeros, the PRACH Mask index may be employed, by the gNB 170, to indicate a RACH occasion associated with the SS/PBCH indicated by SS/PBCH index for the PRACH transmission, according to Subclause 5.1.1 of 3GPP NR Specification #TS 38.321. For other cases, the four bits of the PRACH Mask index may be considered to be reserved.

A bit field is contemplated for RCC state indication.

The RCC state indication bit field of the DCI may be used, by the gNB 170, to indicate a subset of the UEs 110 that are to process the DCI to determine configuration parameters. In one alternative, the RCC state indication bit field has a bit length of one. In this alternative, a "0" value contained by the RCC state indication bit field indicates that UEs 110 that are in the RRC_IDLE state 2602 are to process the DCI and a "1" value contained by the RCC state indication bit field indicates that UEs 110 that are in the RRC_INACTIVE state 2606 are to process the DCI.

In another alternative, the RCC state indication bit field has a bit length of two. In this alternative, a "01" value contained by the RCC state indication bit field indicates that UEs 110 that are in the RRC_IDLE state 2602 are to process the DCI, a "10" value contained by the RCC state indication bit field indicates that UEs 110 that are in the RRC_INACTIVE state 2606 are to process the DCI and a "11" value contained by the RCC state indication bit field indicates that UEs 110 that are in the RRC_CONNECTED state 2604 are to process the DCI. The "00" value may be reserved for future use.

A bit field is contemplated for UE group indication.

The UE group indication bit field of the DCI may be used, by the gNB 170, to indicate a group of the UEs 110 that are to process the DCI to determine configuration parameters. In one alternative, the RCC state indication bit field has a bit length of two. In this alternative: a "00" value contained by the UE group indication bit field indicates that UEs 110 that are in "Group 1" are to process the DCI; a "01" value contained by the UE group indication bit field indicates that UEs 110 that are in "Group 2" are to process the DCI; a "10" value contained by the UE group indication bit field indicates that UEs 110 that are in "Group 3" are to process the DCI; and a "11" value contained by the UE group indication bit field indicates that UEs 110 that are in "Group 4" are to process the DCI. Generically, the UE group indication bit field may be m bits long and may, accordingly, allow distinctions between $2^m$ groups. One of the group indication, for example "00" indication, can indicate to the UEs that the group indication bit field should be ignored and the DCI should be processed by UEs.

A bit field is contemplated for SRS transmission comb indication.

The SRS transmission comb indication bit field of the DCI may be used, by the gNB 170, to indicate a SRS transmission comb to be used by the UE 110 in receipt of the DCI. In one alternative, the SRS transmission comb indication bit field has a bit length of one. In this alternative, a "0" value contained by the SRS transmission comb indication bit field corresponds to "n1: comb value 1" and a "1" value contained by the SRS transmission comb indication bit field corresponds to "n2: comb value 2".

In another alternative, the SRS transmission comb indication bit field has a bit length of two. In this alternative, a "00" value contained by the SRS transmission comb indication bit field corresponds to "n1: comb value 1," a "01" value contained by the SRS transmission comb indication bit field corresponds to "n2: comb value 2" and a "10" value contained by the SRS transmission comb indication bit field corresponds to "n4: comb value 4". The "11" value may be reserved for future use.

Currently, when configured for SRS transmission, there is no support for a UE 110 in the RRC_CONNECTED state 2604 to implement the transmission comb known as "n1". However, there is support for the UE 110 in the RRC_CONNECTED state 2604 to implement the transmission combs known as "n2" and "n4". An indication of an SRS transmission comb may be indicated, to the UE 110, in a paging DCI, in a new DCI (described hereinbefore), in a paging message, by an SRS-Config parameter, among other mechanisms. Indeed, there may exists an agreed-upon default transmission comb. The default comb transmission may be restricted to a specific RRC state, restricted to a group of UEs (assigned by group ID field for example) or apply for UEs in all RRC states or groups.

A bit field is contemplated for SRS BWP indication.

The SRS BWP indication bit field of the DCI may be used, by the gNB 170, to indicate an uplink BWP for SRS transmission. Normally, although multiple BWPs may be defined for uplink, only a BWP designated as the "active" BWP may be used by the UE 110. Conveniently, the SRS BWP indication bit field allows for the UE 110 to transmit the SRS transmission using a BWP that is distinct from the active BWP.

A bit field is contemplated for SRS spatial relation information indication.

The SRS spatial relation information indication bit field of the DCI may be used, by the gNB 170, to specify, to a UE 110, a configuration of a spatial relation between a reference RS and a target SRS. The reference RS can be a Synchronization Signal Block (SSB), a Channel State Information Reference Signal (CSI-RS) or an SRS transmission (see clause 6.2.1 of 3GPP NR Specification #TS 38.214).

The SRS spatial relation information indication bit field may have a bit length of two. In this configuration, a "00" value contained by the SRS spatial relation information indication bit field corresponds to "SSB," a "01" value contained by the SRS spatial relation information indication bit field corresponds to "CSI-RS" and a "10" value contained by the SRS spatial relation information indication bit field corresponds to "SRS". The "11" value may be reserved for future use. It should be understood that the mapping of value to particular indications is provided for an example only and that alternative mappings are also available.

Optionally, the SRS spatial relation information indication bit field of the DCI may be used, by the gNB 170, to specify, to a UE 110, a Serving cell ID. If this option is not exercised, the known servingCellId may be used.

A bit field is contemplated for SRS CP indication.

The SRS CP indication bit field of the DCI may be used, by the gNB 170, to indicate, to a UE 110, whether to use a normal CP or an extended CP (12 symbols per slot) when performing SRS transmission.

A bit field is contemplated for SRS CP multiplier indication.

The SRS CP multiplier indication bit field of the DCI may be used, by the gNB 170, to specify, to a UE 110, a CP multiplier. Absence of the optional SRS CP multiplier indication bit field may indicate, to the UE 110, that an RRC configured value or a default value is to be used for the CP when performing SRS transmission. The SRS CP multiplier indication bit field may be used together with the SRS CP indication bit field or separately from the SRS CP indication bit field.

In one alternative, wherein the SRS CP multiplier indication bit field has a bit length of one, a "0" value contained by the SRS CP multiplier indication bit field corresponds to specifying that the UE 110 is to use, for the CP, the "RRC configured CP value/BWP configuration" and a "1" value contained by the SRS CP multiplier indication bit field corresponds to specifying that the UE 110 is to use, for the CP, "2 times the RRC configured CP value/BWP configuration."

In another alternative, wherein the SRS CP multiplier indication bit field has a bit length of one, a "0" value contained by the SRS CP multiplier indication bit field corresponds to specifying that the UE 110 is to use, for the CP, "1.5 times the RRC configured CP value" and a "1" value contained by the SRS transmission comb indication bit field corresponds to specifying that the UE 110 is to use, for the CP, "2 times the RRC configured CP value."

In a further alternative, wherein the SRS transmission CP multiplier bit field has a bit length of two, a "00" value contained by the SRS CP multiplier indication bit field corresponds to specifying that the UE 110 is to use, for the CP, "1.25 times the RRC configured CP value," a "01" value contained by the SRS CP multiplier indication bit field corresponds to specifying that the UE 110 is to use, for the CP, "1.50 times the RRC configured CP value," a "10" value contained by the SRS CP multiplier indication bit field corresponds to specifying that the UE 110 is to use, for the CP, "1.75 times the RRC configured CP value" and a "11" value contained by the SRS CP multiplier indication bit field corresponds to specifying that the UE 110 is to use, for the CP, "2 times the RRC configured CP value."

In a still further alternative, wherein the SRS transmission CP multiplier bit field has a bit length of two, a "00" value contained by the SRS CP multiplier indication bit field corresponds to specifying that the UE 110 is to use, for the CP, "the RRC configured CP value," a "01" value contained by the SRS CP multiplier indication bit field corresponds to specifying that the UE 110 is to use, for the CP, "1.25 times the RRC configured CP value," a "10" value contained by the SRS CP multiplier indication bit field corresponds to specifying that the UE 110 is to use, for the CP, "1.5 times the RRC configured CP value" and a "11" value contained by the SRS CP multiplier indication bit field corresponds to specifying that the UE 110 is to use, for the CP, "2 times the RRC configured CP value."

A bit field is contemplated for SRS CP adjustment/offset indication.

The SRS CP adjustment/offset bit field of the DCI may be used, by the gNB 170, to specify, to a UE 110, a CP adjustment/offset. Absence of the optional SRS CP adjustment/offset indication bit field may indicate, to the UE 110, that an RRC configured value or a default value is to be used for the CP when performing SRS transmission. The SRS CP adjustment/offset indication bit field may be used together with the SRS CP indication bit field or separately from the SRS CP indication bit field.

In one alternative, wherein the SRS CP adjustment/offset indication bit field has a bit length of one, a "0" value contained by the SRS CP adjustment/offset indication bit field corresponds to specifying that the UE 110 is to increment the CP by an RRC configured amount and a "1" value contained by the SRS CP adjustment/offset indication bit field corresponds to specifying that the UE 110 is to increment the CP by an RRC configured amount (see table 1900A in FIG. 19A).

In another alternative, wherein the SRS CP adjustment/offset bit field has a bit length of two, a "00" value contained by the SRS CP adjustment/offset indication bit field corresponds to specifying that the UE 110 is to decrement the CP by the RRC configured amount 0, a "01" value contained by the SRS CP adjustment/offset indication bit field corresponds to specifying that the UE 110 is to increment the CP by half the RRC configured amount 1, a "10" value contained by the SRS CP adjustment/offset indication bit field corresponds to specifying that the UE 110 is to increment the CP by once the RRC configured amount 2 and a "11" value contained by the SRS CP adjustment/offset indication bit field corresponds to specifying that the UE 110 is to increment the CP by twice the RRC configured amount 3 (see table 1900B in FIG. 19B). FIG. 19C illustrates a table 1900C of configured amounts. It should be understood that the mapping of values to particular indications is provided for an example only and that alternative mappings are also available.

SRS transmissions are primarily designed to be transmitted by the UE 110 when accurate TA is known. But in the RRC_INACTIVE state 2606, the UE 110 may not be uplink synchronized, or the TA may be out of date. It is known that the UE 110 may be downlink synchronized using SSB/PBCH.

In one aspect of the present application, SRS CP length, $N_{CP}$, may be adjusted by a multiplication factor that depends on a level of asynchronous transmission expected. The level may be based on cell range. The length of an adjusted SRS CP may be given by $aN_{cp}$, where $\alpha \geq 1$ is a factor of CP increase (see clause 5.3.1 of 3GPP NR Specification #TS 38.211). The factor a may be indicated to the UE 110 by an SRS-Config parameter or may be specified in a mapping table or may be indicated by DCI bit field(s).

$$N_{CP,l}^{\mu} = \begin{cases} 512\kappa \cdot a \cdot 2^{-\mu} & \text{extended cyclic prefix} \\ 144\kappa \cdot a \cdot 2^{-\mu} + 16 \cdot a \cdot \kappa & \text{normal cyclic prefix, } l = 0 \text{ or } l = 7 \cdot 2^{\mu} \\ 144\kappa \cdot a \cdot 2^{-\mu} & \text{normal cyclic prefix, } l \neq 0 \text{ or } l \neq 7 \cdot 2^{\mu} \end{cases}$$

In another aspect of the present application, SRS CP length, $N_{CP}$, may be offset by a specified additive adjustment value, b (see clause 5.3.1 of 3GPP NR Specification #TS 38.211). The adjustment value b may be indicated to the UE 110 by an SRS-Config parameter or may be specified in a mapping table or may be indicated by DCI bit field(s).

$$N_{CP,l}^{\mu} = \begin{cases} 512\kappa \cdot 2^{-\mu} + b & \text{extended cyclic prefix} \\ 144\kappa \cdot 2^{-\mu} + 16 \cdot \kappa + b & \text{normal cyclic prefix, } l = 0 \text{ or } l = 7 \cdot 2^{\mu} \\ 144\kappa \cdot 2^{-\mu} + b & \text{normal cyclic prefix, } l \neq 0 \text{ or } l \neq 7 \cdot 2^{\mu} \end{cases}$$

A bit field is contemplated for UE indication.

A value in the UE indication bit field, together with the I-RNTI, may be used to specifically identify a UE 110. The I-RNTI may be used to specify a group of UEs having a group size up to $2^{16}$. The I-RNTI together with an m-bit value in the UE indication bit field can be used to identify a UE 110 in the RRC_INACTIVE state. Accordingly, a total of $2^{16+m}$ UEs may be addressed using this scheme. In one example, the I-RNTI is formed from the 16 Most Significant Bits of the 24-bit ShortI-RNTI and a value for the UE indication bit field may be formed from the eight Least Significant Bits of the 24-bit ShortI-RNTI. In this example, a total of $2^{24}$ UEs 110 may be addressed.

A bit field is contemplated for SRS or preamble triggering.

A UE 110 may already be configured for SRS transmissions or preamble transmission. The SRS or preamble triggering bit field of the DCI may be used, by the gNB 170, to instruct the UE 110 to activate a transmission of the type (SRS or preamble) for which the UE 110 has been configured. The SRS or preamble triggering bit field may have a length of one bit, wherein a value of "0" may be understood, by the UE 110, as an instruction to activate transmission and a value of "1" may be understood, by the UE 110, as an instruction to deactivate transmission.

A bit field is contemplated for SRS or preamble trigger delay.

The SRS or preamble trigger delay bit field of the DCI may be used, by the gNB 170, to instruct the UE 110 to delay activation of the transmission of the configured type (SRS or preamble) by a duration specified as a value contained in the SRS or preamble trigger delay bit field. Upon receiving a DCI that includes a "0" value in the SRS or preamble triggering bit field, the UE 110 may delay activating transmission by the delay referenced in the SRS or preamble trigger delay bit field.

There may already be a fixed trigger delay configured by RRC or agreed upon as a default value. Accordingly, the delay ("DCI trigger delay") referenced in the SRS or preamble trigger delay bit field may be added to the fixed trigger delay, i.e., total trigger delay=fixed trigger delay+ DCI trigger delay.

In the absence of the SRS or preamble triggering bit field, the presence of the SRS or preamble trigger delay bit field may act to both instruct the UE 110 to activate transmission and provide a value for DCI trigger delay.

The value for the DCI trigger delay may be selected, by the gNB 170, from amongst N options and may be indicated using $\log_2$ N bits.

A bit field is contemplated for SRS or preamble trigger occasion.

The SRS or preamble trigger occasion bit field of the DCI may be used, by the gNB 170, to instruct the UE 110 to start a transmission of the configured type (SRS or preamble) on a transmission occasion corresponding to a value contained in the SRS or preamble trigger occasion bit field. The value for the DCI trigger delay may be selected, by the gNB 170, from amongst M options and may be indicated using $\log_2$ M bits.

In one alternative, wherein the SRS or preamble trigger occasion bit field has a bit length of one, a "0" value contained by the SRS or preamble trigger occasion bit field corresponds to specifying that the UE 110 is to start transmission on the first occasion and a "1" value contained by the SRS or preamble trigger occasion bit field corresponds to specifying that the UE 110 is to start transmission on the second occasion.

In another alternative, wherein the SRS or preamble trigger occasion bit field has a bit length of two, a "00" value contained by the SRS or preamble trigger occasion bit field corresponds to specifying that the UE 110 is to start transmission on the first occasion, a "01" value contained by the SRS or preamble trigger occasion bit field corresponds to specifying that the UE 110 is to start transmission on the second occasion, a "10" value contained by the SRS or preamble trigger occasion bit field corresponds to specifying that the UE 110 is to start transmission on the third occasion and a "11" value contained by the SRS or preamble trigger occasion bit field corresponds to specifying that the UE 110 is to start transmission on the fourth occasion.

A bit field is contemplated for a Short Message Indicator with an interpretation as provided by the table 700 in FIG. 7.

A bit field is contemplated for a Short Message with an interpretation as provided by the table 900 in FIG. 9.

A bit field is contemplated for SRS numerology indication.

The SRS numerology indication bit field of the DCI may be used, by the gNB 170, to provide support for a plurality of different SRS numerologies and to instruct the UE 110 to dynamically change the SRS numerology according to network requirements.

In one alternative, wherein the SRS numerology indication bit field has a bit length of two, a "00" value contained by the SRS or numerology indication bit field corresponds to specifying that the UE 110 is to use 1.25 kHz subcarrier spacing, a "01" value contained by the SRS numerology indication bit field corresponds to specifying that the UE 110 is to use 5 kHz subcarrier spacing, a "10" value contained by the SRS numerology indication bit field corresponds to specifying that the UE 110 is to use 15 kHz subcarrier spacing and a "11" value contained by the SRS numerology indication bit field corresponds to specifying that the UE 110 is to use 30 kHz subcarrier spacing.

In another alternative, wherein the SRS numerology indication bit field has a bit length of two, a "00" value contained by the SRS or numerology indication bit field corresponds to specifying that the UE 110 is to use subcarrier spacing that is the same as reference subcarrier spacing, a "01" value contained by the SRS numerology indication bit field corresponds to specifying that the UE 110 is to use subcarrier spacing that is one twelfth of the reference subcarrier spacing and a "10" value contained by the SRS numerology indication bit field corresponds to specifying that the UE 110 is to use subcarrier spacing that is one third of the reference subcarrier spacing. The "11" value may be reserved for future use. The reference subcarrier spacing may be predefined in a standard specification or be the same as a subcarrier spacing configured for BWP.

In a further alternative, wherein the SRS numerology indication bit field has a bit length of three, a "000" value contained by the SRS or numerology indication bit field corresponds to specifying that the UE 110 is to use 1.25 kHz subcarrier spacing, a "001" value contained by the SRS numerology indication bit field corresponds to specifying that the UE 110 is to use 5 kHz subcarrier spacing, a "010" value contained by the SRS numerology indication bit field corresponds to specifying that the UE 110 is to use 7.5 kHz subcarrier spacing, a "011" value contained by the SRS numerology indication bit field corresponds to specifying that the UE 110 is to use 15 kHz subcarrier spacing, a "100" value contained by the SRS or numerology indication bit field corresponds to specifying that the UE 110 is to use 30 kHz subcarrier spacing, a "101" value contained by the SRS numerology indication bit field corresponds to specifying that the UE 110 is to use 60 kHz subcarrier spacing, a "110" value contained by the SRS numerology indication bit field corresponds to specifying that the UE 110 is to use 120 kHz subcarrier spacing and a "111" value contained by the SRS numerology indication bit field corresponds to specifying that the UE 110 is to use 240 kHz subcarrier spacing.

In a further alternative, UE in RRC_INACTIVE state uses the numerology and/or configurations of preamble transmission for SRS transmission.

Notably, among the bit fields proposed hereinbefore, only two bit fields (Short Message Indicator and Short Message) are related to paging. The parameters provided by any of the remaining bit fields may be indicated in the payload of a paging message. As has been discussed hereinbefore in the context of paging, some configuration information may be included in a DCI and other information may be provided in a paging message corresponding to the DCI.

In a first example, the following information is transmitted in a DCI having a format described hereinbefore, with a CRC scrambled by an I-RNTI: a first, one-bit bit field including an SRS or preamble indication; a second bit field including a Reference signal ID; a third bit field including an indication of pool size; a fourth bit field indicating an RCC state; and a fifth bit field, which is reserved.

If the value in the first bit field indicates SRS, the size, in bits, of the third bit field may be determined as $\log_2 N_{SRS}$, where $N_{SRS}$ is the SRS pool size.

If the value in the first bit field indicates preamble, the size, in bits, of the third bit field may be determined as $\log_2 N_{PREAMBLE}$, where $N_{PREAMBLE}$ is the preamble pool size.

In a second example, the following information is transmitted in a DCI having a format described hereinbefore, with a CRC scrambled by an I-RNTI: a first, one-bit bit field including an SRS or preamble indication; a second bit field including a Reference signal ID; a third bit field including an indication of pool size; a fourth bit field with UL/SUL to indicate a UL carrier within the cell on which to transmit the PRACH; a fifth bit field with an SS/PBCH index; a sixth bit field with a four-bit PRACH Mask index; and a seventh bit field, which is reserved.

In a third example, the following information is transmitted in a DCI having a format described hereinbefore, with a CRC scrambled by an I-RNTI: a first, one-bit bit field including an SRS or preamble indication; a second bit field including a Reference signal ID; a third bit field including an indication of pool size; a fourth bit field including an indication of a UE group, having length m bits; and a fifth bit field, which is reserved.

In a fourth example, the following information is transmitted in a DCI having a format described hereinbefore, with a CRC scrambled by an I-RNTI: a first, one-bit bit field including an SRS or preamble indication; a second bit field including a Reference signal ID; a third bit field including an indication of pool size; a fourth bit field including an indication of an SRS transmission comb—having a length of 1 or 2 bits; a fifth bit field including SRS spatial relation information—having a length of 2 bits; an SRS CP indication or an SRS CP multiplier indication or an SRS CP adjustment/offset—having a length of 1 or 2 bits; a sixth bit field having an indication of SRS BWP—having a length of 2 bits; and a seventh bit field, which is reserved.

In a fifth example, the following information is transmitted in a DCI having a format described hereinbefore, with a CRC scrambled by an I-RNTI: a first, eight-bit bit field including a UE indication; a second, one-bit bit field including an SRS or preamble indication; a third bit field including a Reference signal ID; and a third bit field including an indication of pool size. Notably, as discussed hereinbefore, in one example, the I-RNTI is formed from the 16 Most Significant Bits of the 24-bit ShortI-RNTI and a value for the UE indication bit field may be formed from the eight Least Significant Bits of the 24-bit ShortI-RNTI. In general, 16 bits (the MSB bits, selected bits or as a function etc.) from the 24-bit ShortI-RNTI may be used as I-RNTI and a number, m, of bits (LSB bits, selected bits or as a function etc.) may be used as UE indication bit field.

In a sixth example, the following information is transmitted in a DCI having a format described hereinbefore, with a CRC scrambled by an I-RNTI: a first, two-bit bit field including a Short Message Indicator; a second, eight-bit bit field including a Short Message; a third, one-bit bit field including an SRS or preamble indication; a third bit field including a Reference signal ID; and a third bit field including an indication of pool size.

A transmission from a UE 110 during a time in which uplink transmissions are not synchronized is known to cause interference with other transmissions from other UEs 110.

Some UEs 110 may be uplink synchronized (e.g., while the UEs 110 are in the RRC_CONNECTED state) whereas other UEs 110 may not be uplink synchronized (e.g., while the UEs 110 are in the RRC_INACTIVE state or the RRC_IDLE state).

Figure 20:
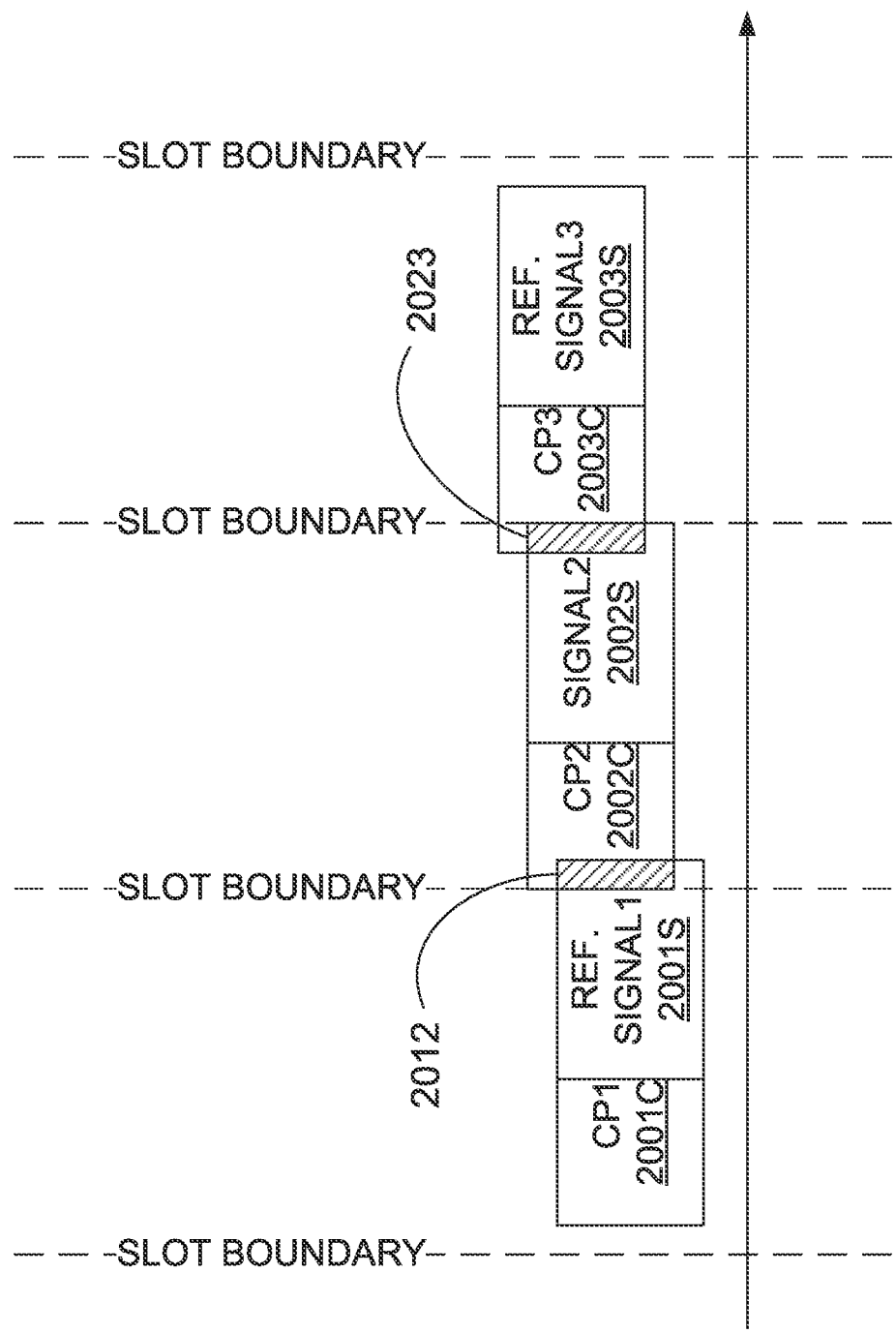
FIG. 20 illustrates that interference may occur in system as a gNB receives signals from UEs.

Due to use of erroneous TA, interference may occur in the system and, especially, as a gNB 170 receives signals from UEs 110, as illustrated in FIG. 20. A primary signal is labeled "signal2" and is associated with reference numeral 2002S. Signal2 2002S has a cyclic prefix, CP2, associated with reference numeral 2002C. A reference signal is labeled "ref. signal1" and is associated with reference numeral 2001S. Ref. signal1 2001S has a cyclic prefix, CP1, associated with reference numeral 2001C. Another reference signal is labeled "ref. signal3" and is associated with reference numeral 2003S. Ref. signal3 2003S has a cyclic prefix, CP3, associated with reference numeral 2003C.

In a first scenario, FIG. 20 illustrates a first interference 2012 between ref. signal1 2001S and the combination of CP2 2002C and signal2 2002S. The first interference 2012 may come about as a result of a UE1 (not shown) transmitting the signal1 2001S with a smaller TA than appropriate for the actual propagation delay between the UE1 and the gNB 170.

In a second scenario, FIG. 20 illustrates a second interference 2023 between ref. signal3 2003S and the combination of CP2 2002C and signal2 2002S. The second interference 2023 may come about as a result of a UE3 (not shown) transmitting the signal3 2003S with a larger TA than appropriate for the actual propagation delay between the UE3 and the gNB 170.

It has been established that when UEs 110 are in the RRC_INACTIVE state 2606, the UEs 110 are not well synchronized with the corresponding gNB 170 and, accordingly, TA estimation, by the gNB 170, is difficult to accomplish with reliable accuracy. This lack of synchronization may occur as a result of the UE 110 having been through a relatively long period of inactivity in the RRC_INACTIVE state or the RRC_IDLE state in combination with continued mobility of the UE 110.

It is clear that transmissions from UEs 110 at different positions within the coverage area will be received, at the gNB 170, in different time instances even though the transmissions are expected to be received, at the gNB 170, in the same time instance. These different time instances for transmission receipt may be at least partially due to imperfect or outdated TA estimation.

To avoid interference with other transmissions, it is proposed herein to introduce a guard period for SRS transmissions. Currently, a guard period is not supported for SRS transmissions. It is proposed herein that a guard period for SRS symbols (see clause 5.3.2 of 3GPP NR Specification #TS 38.211) may be accomplished by adjusting symbol duration, adjusting symbol length and/or adjusting CP parameters.

Figure 21:
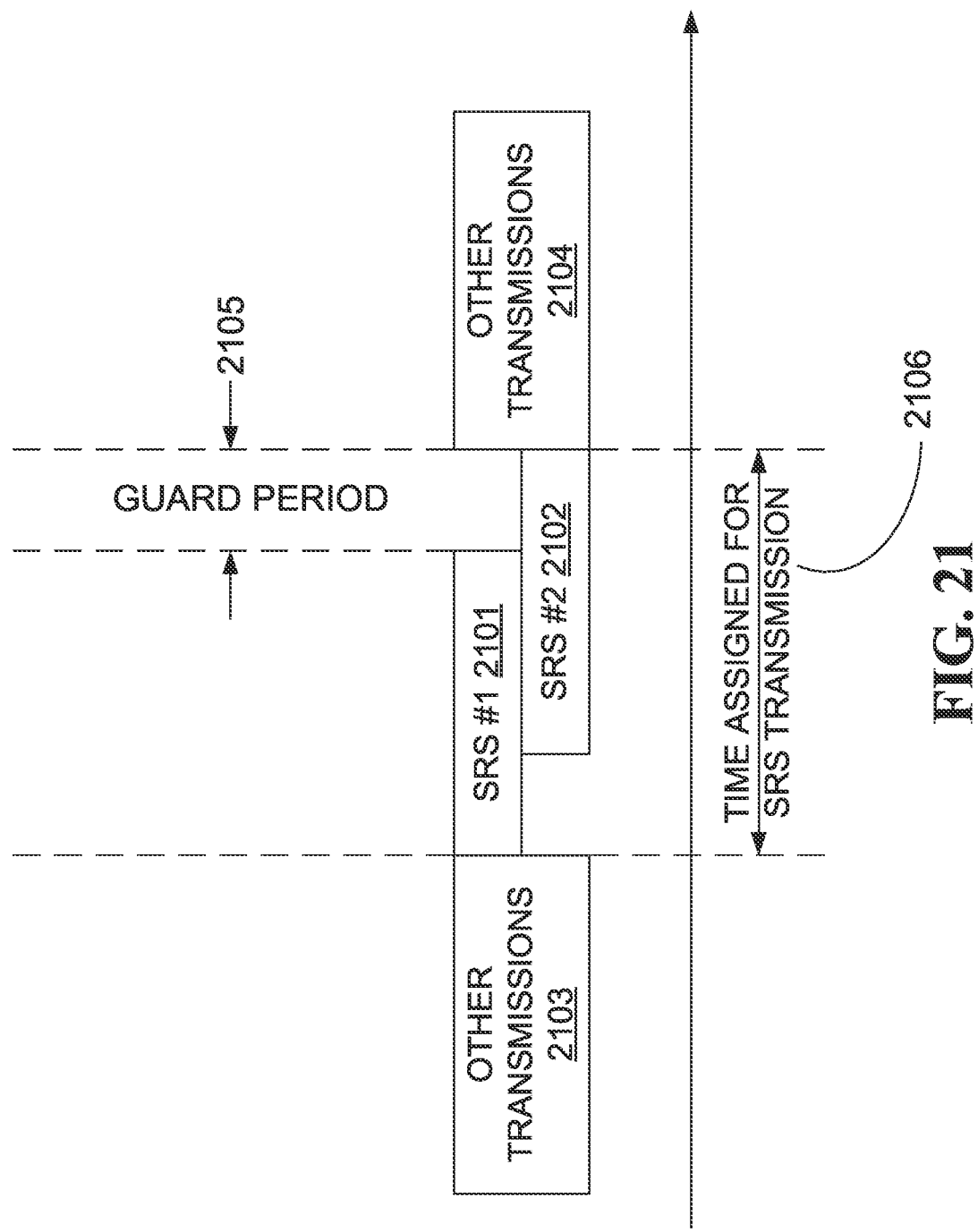
FIG. 21 illustrates reception, at a gNB, of a first SRS transmission and a second SRS transmission in the context of other transmissions.

FIG. 21 illustrates temporal receipt, at a gNB 170, of a first SRS transmission 2101 and a second SRS transmission 2102 in the context of other transmissions 2103, 2104. Although the first SRS transmission 2101 is shown to start at the end of other transmissions 2103, depending on the propagation delay, the first SRS transmission 2101 may arrive at a different time instance. Similarly, the second SRS transmission 2102 is shown to end at the beginning of other transmissions 2104. Depending on the propagation delay, the second SRS transmission 2102 may arrive at a different time instance. According to current practices, a time assigned, by the gNB 170, for SRS transmission 2106 is expected to have the same duration and temporal position as the first SRS transmission 2101. However, according to aspects of the present application, the time assigned for SRS transmission 2106 is expanded by a guard period 2105. Such expansion allows for receipt, by the gNB 170, of the second SRS transmission 2102, which is associated with a poor TA estimate, thereby reducing interference to the other transmission 2104.

Notably, the second SRS transmission 2102 can use subcarrier spacing that is distinct from the subcarrier spacing used by the other transmissions 2103, 2104 and distinct from the subcarrier spacing used by the first SRS transmission 2101. In one example, the subcarrier spacing used for the second SRS transmission 2102 can be a fraction of the subcarrier spacing used for the other transmissions 2103, 2104. In another example, the subcarrier spacing used for the second SRS transmission 2102 can be a value specified in RRC signaling or a value specified in a DCI indication.

A given SRS transmission may include a CP for every SRS symbol or a CP for every SRS transmission.

Figure 22:
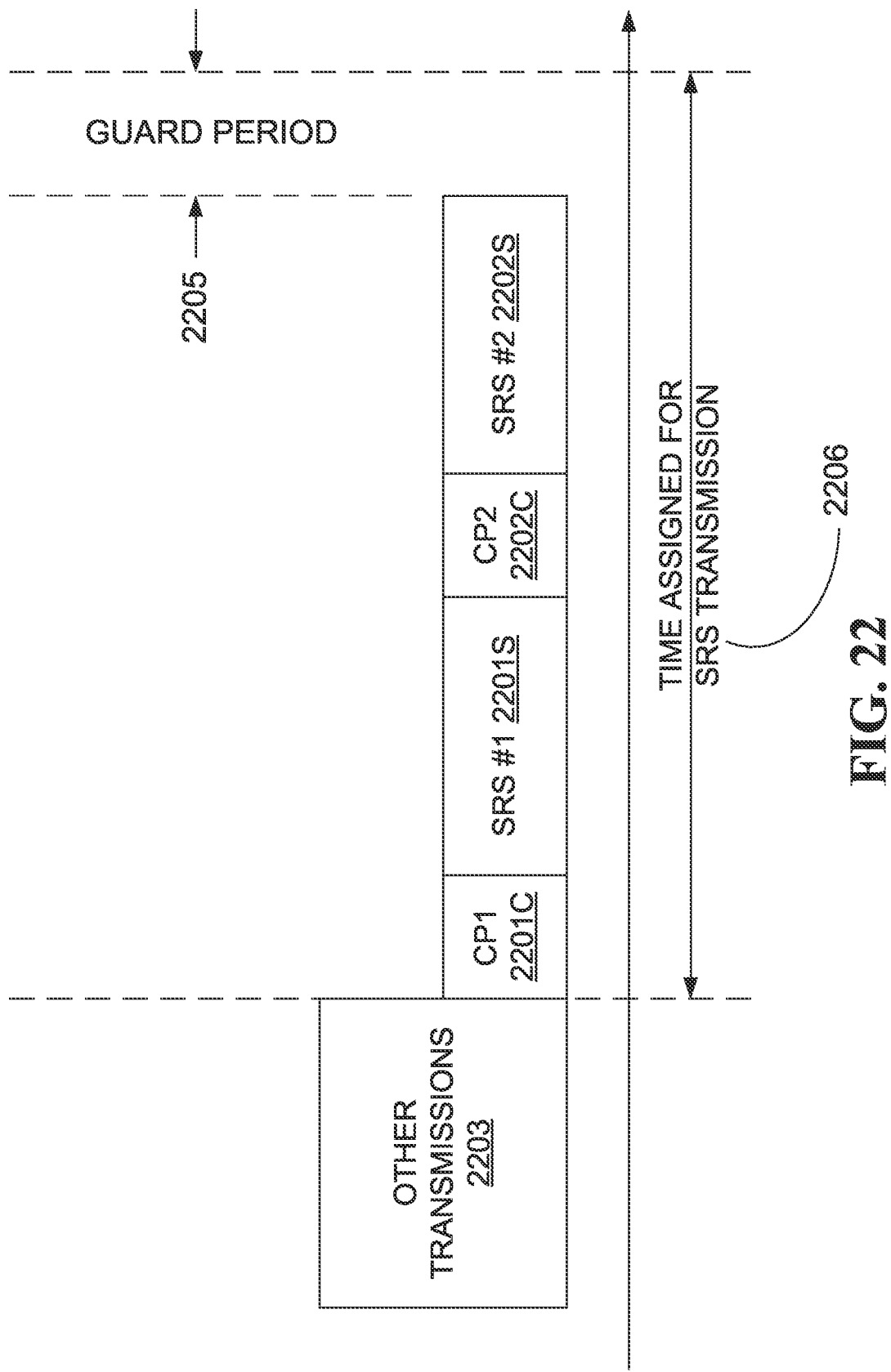
FIG. 22 illustrates reception, at a gNB, of a first SRS transmission and a second SRS transmission in the context of cyclic prefixes and another transmission.

FIG. 22 illustrates temporal receipt, at a gNB 170, of a first SRS transmission 2201S and a second SRS transmission 2202S in the context of other transmissions 2203. The first SRS transmission 2201S is associated with a first CP, CP1 2201C and the second SRS transmission 2202S is associated with a second CP CP2 2202C. Although the CP1 2201C transmission is shown to start at the end of other transmissions 2203, depending on the propagation delay, the CP1 2201C transmission may arrive at a different time instance relative to other transmissions 2203.

Figure 23:
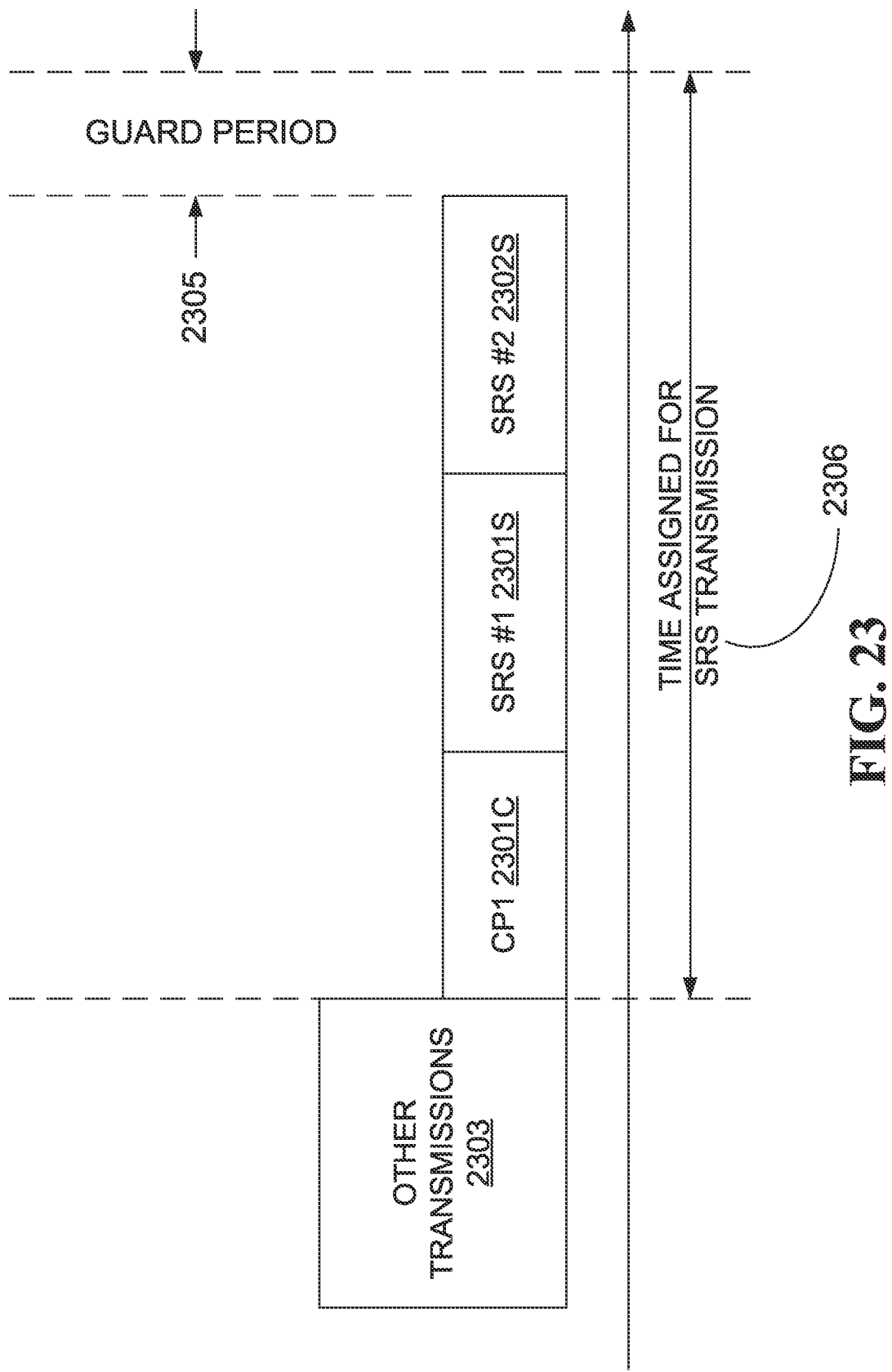
FIG. 23 illustrates temporal receipt, at a gNB, of a first SRS transmission and a second SRS transmission in the context of a cyclic prefix and another transmission.

FIG. 23 illustrates temporal receipt, at a gNB 170, of a first SRS transmission 2301S and a second SRS transmission 2302S in the context of other transmissions 2303. Only one CP, CP1 2301C, is received. The transmissions are received in a time arranged for SRS transmission 2306. Although the CP1 2301C transmission is shown to start at the end of other transmissions 2303, depending on the propagation delay, the CP1 2301C transmission may arrive at a different time instance relative to the other transmissions 2303.

Figure 24:
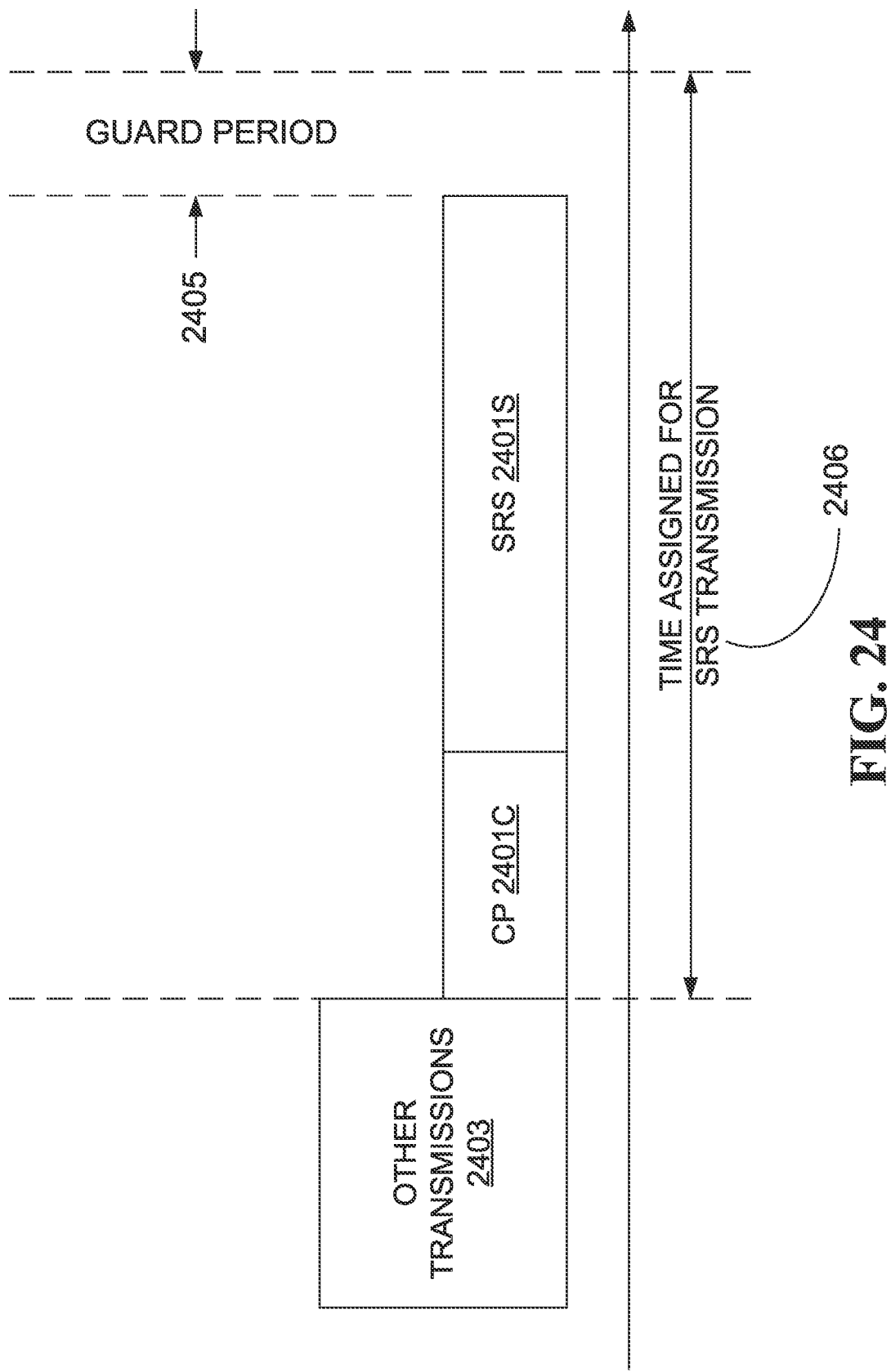
FIG. 24 illustrates temporal receipt, at a gNB, of a SRS transmission and a cyclic prefix in the context of another transmission.

FIG. 24 illustrates temporal receipt, at a gNB 170, of an SRS transmission 2401 in the context of other transmissions 2403. Only one CP 2401C is received. Although the CP1 2401C transmission is shown to start at the end of other transmissions 2403, depending on the propagation delay, the CP1 2401C transmission may arrive at a different time instance relative to the other transmissions 2403.

In FIGS. 22 and 23, the two SRS transmissions may be the same or may be different. That is, the two SRS transmissions may be based on the same SRS sequence or different SRS sequences. The same SRS sequence may be generated by using the same SRS index from a pool of SRS sequences. Different SRS sequences may be generated by using different SRS indices from a pool of SRS sequences. Alternatively, different SRS sequences may be generated by using the same SRS index from a pool of SRS sequences by changing a parameter. Such parameters may include cyclic shift, group sequence, etc. Notably, in FIG. 22, even when the two SRS transmissions 2201S, 2202S are the same, the first CP, CP1 2201C may be distinct from the second CP, CP2 2202C. Furthermore, the first CP, CP1 2201C, and the second CP, CP2 2202C, may be an extended CP or a normal CP. Either CP 2201C, 2202C may be indicated as a multiplier factor of the CP that has been configured by RRC signaling. Either CP 2201C, 2202C may be indicated as a multiplier factor of the CP that has been configured for a particular bandwidth part.

In FIG. 22, the duration of the reception of the SRS sequence transmissions 2201S, 2202S (including CP1 2201C and CP2 2202C) does not fill a time arranged for SRS transmission 2206, which includes a guard period 2205.

In FIG. 23, the duration of the reception of the SRS sequence transmissions 2301S, 2302S (including CP1 2301C) does not fill a time arranged for SRS transmission 2306, which includes a guard period 2305.

In FIG. 24, the duration of the reception of the SRS sequence transmissions 2401S (including CP 2401C) does not fill a time arranged for SRS transmission 2406, which includes a guard period 2405.

As discussed hereinbefore, the guard period 2205, 2305, 2405 may be seen to allow for mitigation of poor TA estimation.

Notably, SRS transmission may take the entire time arranged for SRS transmission. Furthermore, SRS transmission may take any location within a slot. For example, in a normal CP, a slot consists of 14 OFDM symbols and the SRS transmission may be configured to start at any symbol within the slot.

Although SRS transmissions are shown with a guard time, in practice, a guard time value of zero (no guard time) can be a configurable option. In particular, the UE 110 is uplink synchronized and in the RRC_INACTIVE state 2606 or the RRC_IDLE state 2602, the gNB 170 may configure the UE 110 for SRS transmission without a guard period to better utilize the radio resources and such a zero guard period configuration is supported.

The approach illustrated in FIG. 22 may be considered to have benefits over the approach illustrated in FIG. 23 and the approach illustrated in FIG. 24 in that the approach illustrated in FIG. 22 allows for sequence hopping. SRS sequence hopping may allow for achieving a relatively higher sequence diversity and, thereby, effectively mitigate the interference among them. Additionally, the approach illustrated in FIG. 22 may be considered to have benefits over the approach illustrated in FIG. 24 in that the approach illustrated in FIG. 22 may be considered to provide mobility support in that the subcarrier spacing in the approach illustrated in FIG. 22 is larger than the subcarrier spacing in the approach illustrated in FIG. 24. This is due to the fact that SRS transmission duration in FIG. 24 can be longer.

The approach illustrated in FIG. 23 may be considered to have benefits over the approach illustrated in FIG. 22 in that the approach illustrated in FIG. 23 has a larger CP. A larger CP allows for improved operation in the absence of synchronous communication between the UE 110 and the gNB 170. A larger CP allows for improved operation in a multipath environment. A larger CP allows for improved operation in a large cell environment. Additionally, the approach illustrated in FIG. 23 may be considered to have benefits over the approach illustrated in FIG. 24 in that the approach illustrated in FIG. 23 may be considered to provide better mobility support in that the subcarrier spacing in the approach illustrated in FIG. 23 is larger than the subcarrier spacing in the approach illustrated in FIG. 24.

The approach illustrated in FIG. 24 may be considered to have benefits over the approach illustrated in FIG. 22 in that the approach illustrated in FIG. 24 has a larger CP. A larger CP allows for improved operation in the absence of synchronous communication between the UE 110 and the gNB 170. A larger CP allows for improved operation in a multipath environment. A larger CP allows for improved operation in a large cell environment.

Additionally, the approach illustrated in FIG. 24 may be considered to have benefits over the approach illustrated in FIG. 23 in that the approach illustrated in FIG. 24 may be considered to provide a larger sequence pool. Conveniently, the larger sequence pool allows for addressing a larger number of UEs 110 and improved TA estimation.

In aspects of this application, in general, using DCI, a UE 110 may reconfigure transmission parameters, or update UE behavior and procedures. Such configurations may be related to SRS or preamble transmission as described above. Configurations can also or instead be related to numerology, BWP or HARQ configurations (including behaviors and procedure) which are not extensively described in the application. For example, DCI bit fields can be HARQ related bit fields such as new data indicator (1 bit), redundancy version (2 bits as defined in Table 7.3.1.1.1-2 in TS #38.212), HARQ process number (4 bits) including slot aggregation associated with redundancy version. In another example, BWP configurations such as frequency location, bandwidth, subcarrier space, CP etc.

In aspects of the present application, a UE 110 that is not in RRC_CONNECTED state may, upon reception of a DCI format 1_0 scrambled by C-RNTI and "Frequency domain resource assignment" field are of all ones, interpret the remaining DCI bit fields as defined hereinbefore. When such a DCI is received in RRC_INACTIVE state, the UE 110 may use C-RNTI of the RRC_CONNECTED state. Alternatively, the UE 110 may use a new RNTI which was assigned during RRC_CONNECTED state or during RRC suspension procedure when such DCI (with "Frequency domain resource assignment" field are of all ones) is received in RRC_INACTIVE state.

In aspects of the present application, a UE 110 may, upon reception of a DCI, activate/deactivate preamble or SRS transmission. The DCI may, in one example, be the paging DCI discussed hereinbefore or may, in another example, be the new DCI format 1_0 with a CRC scrambled by the I-RNTI, also discussed hereinbefore.

In aspects of the present application, a delay may be employed for UE processing, radio frequency re-tuning and other purposes. The delay may be pre-determined and then stored at the UE 110. Alternatively, the delay may be pre-configured for the UE 110. Further alternatively, the delay may be provided, to the UE 110, in a received DCI.

There are many options for establishing timing for the occasion on which the UE 110 may perform SRS transmission or preamble transmission. The occasion timing may, in one example, be pre-configured at the UE 110. The occasion timing may, in another example, be configured to the UE 110 during a time period during which the UE 110 is in the RRC_CONNECTED state. The occasion timing may, in a still further example, be specified in a yet-to-be-agreed-upon standard.

In accordance with one or more of these examples, the UE 110 may always use the first SRS/preamble transmission occasion immediately after the reception of a DCI or immediately after the reception of a paging message to perform SRS transmission or preamble transmission.

In some aspects of the present application, a received DCI may provide, to the UE 110, an integer. The integer may indicate which SRS/preamble transmission occasion immediately after reception of the DCI or paging message the UE 110 should use to perform SRS transmission or preamble transmission. This type of indication may be appropriate for aperiodic SRS transmission, semi-persistent SRS transmission, periodic SRS transmission or preamble transmission.

In some aspects of the present application, a received DCI may provide, to the UE 110, an integer. The integer may indicate a slot offset immediately from the reception of the DCI or paging message for the UE 110 to perform SRS transmission or preamble transmission. This option may be considered to be appropriate for aperiodic SRS transmission and for preamble transmission although semi-persistent SRS transmission, periodic SRS transmission can use such technique.

For semi-persistent SRS transmission and periodic SRS transmission, slots that satisfy the criteria mentioned in clause 6.4.1.4.4 of 3GPP NR Specification #TS 38.211 can be indicated by the slot offset integer.

A DCI (either a paging DCI or the new DCI discussed hereinbefore) or a paging message may specify: a re-configuration/update only; a triggering (activation/deactivation) of SRS transmission or preamble transmission only; or both a re-configuration/update and an activation/deactivation together.

A paging message may activate/deactivate the SRS transmission or the preamble transmission. A paging message, as discussed hereinbefore, may have a field to trigger SRS-Or-Preamble-Trigger choices (Activate, Deactivate).

Figure 25:
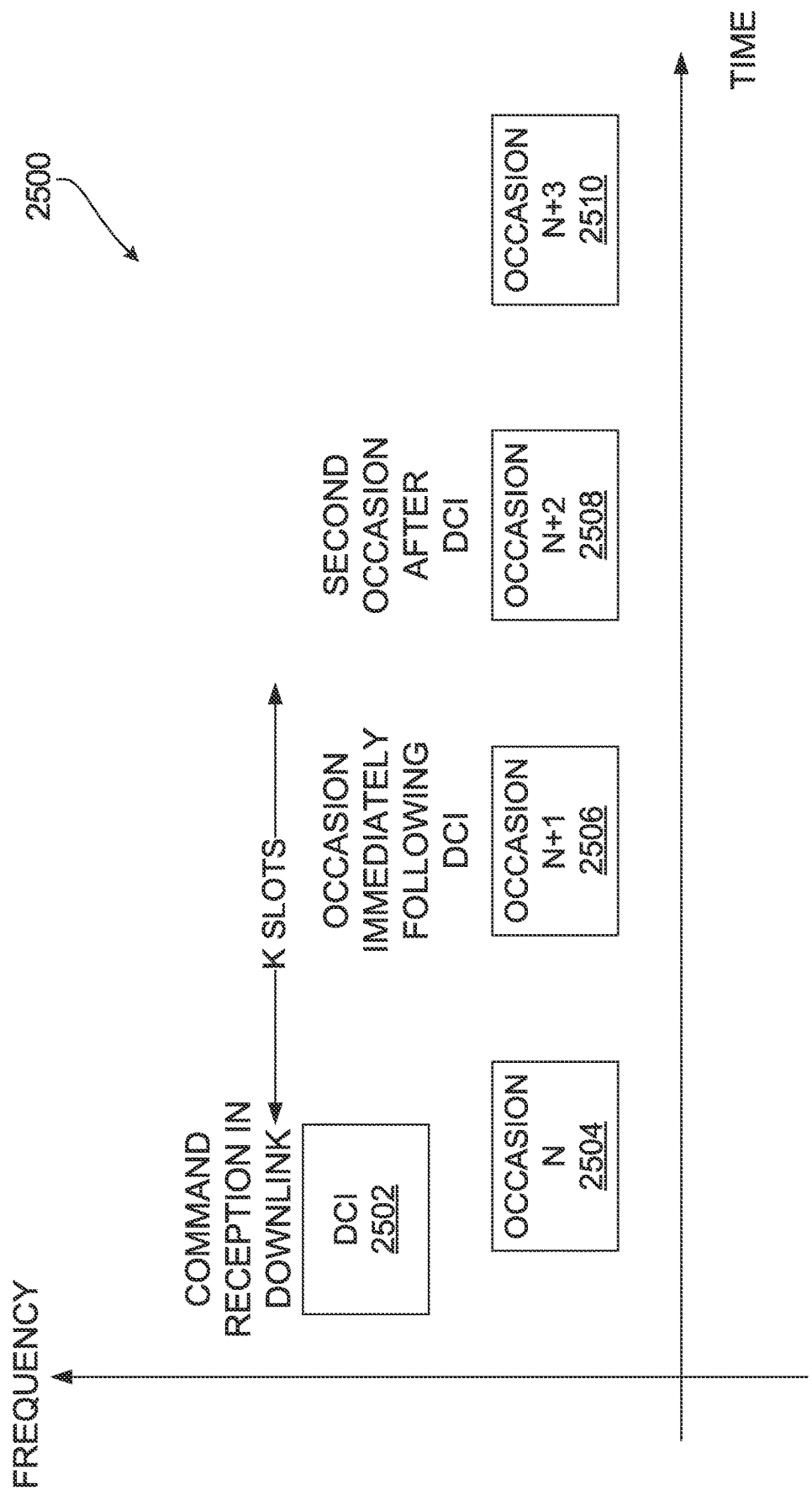
FIG. 25 illustrates a frequency-time resource grid on which grid are placed SRS/Preamble transmission occasions in relation to a DCI.

FIG. 25 illustrates a graph 2500 wherein frequency resources and time resources are presented as axes. SRS/Preamble transmission occasions are placed on the graph in relation to a DCI 2502. The transmission occasions include an occasion N 2504A, an occasion N+1 2504B, an occasion N+2 2504C and an occasion N+3 2504D, collectively or individually 2504. The occasions 2504 may be periodic or semi-persistent in time or in frequency. That is, the separation between consecutive occasions 2504 may be fixed across the resource grid. The occasions 2504 may, alternatively, be aperiodic in time or in frequency. For both periodic occasions 2504 and semi-persistent occasions 2504, the units can be slots, RB, symbols, sub-frames, frames, sub-carriers or combination thereof. The same resources/occasions can be used for other purposes (e.g., PRACH, random access, preamble transmission, legacy SRS transmission, etc.).

Occasions may be configured during a time period during which the UE 110 is in the RRC_CONNECTED state or in the RRC_INACTIVE state. Alternatively, occasions may be configured during a suspension procedure.

In one example, the UE 110 uses the occasion N+1 2504A for SRS transmission or preamble transmission.

In another example, with an integer "2" communicated to the UE 110, the UE 110 uses the occasion N+2 2504B for SRS transmission or preamble transmission.

In another example, in a scenario where K slots are defined, the UE 110 uses the occasion N+2 2504B for SRS transmission or preamble transmission. Slot is used as an example to measure the time, however, in practice, any measure, such as symbol duration, frame, sub-frame, etc., can be used.

In another scenario, the UE 110 the occasion to be used is implicit. Within this scenario, a "capability" or "category" for the UE 110 determines the occasion 2504 that is to be used after receiving the command (DCI 2502) for transmission/activation. Also, within this scenario, when occasions 2504 are configured for other purposes, such as random access, the same occasion 2504 may be used SRS transmission or preamble transmission. Deactivation of SRS transmission may be accomplished in a manner similar to manners that have been discussed hereinbefore.

In some aspects of the present application, DCI format 1_0 with CRC scrambled by P-RNTI may be used to activate/deactivate preamble/SRS transmission. In such cases, the identity of the relevant UE 110 may be found in a received paging message. In particular, a UE 110 may determine itself to be the identified UE upon determining a match to the PagingUE-Identity specified in the paging message. The PagingUE-Identity may be presented as a fullI-RNTI. Further particularly, a UE 110 may determine itself to be the identified UE upon determining a match to the PagingUE-Identity specified in the paging message and while the UE 110 is in the RRC_INACTIVE state. In this embodiment, the reference signal is either an SRS sequence or a preamble sequence. The UE 110 is aware of the reference signal (configurations/parameters), for example, from previous signaling or pre-specified.

In one option, the gNB 170 may employ the two-bit "Short Message Indicator" field (see FIG. 7 and 3GPP NR Specification #TS 38.212, Table 7.3.1.2.1-1) for activation/deactivation purposes. The reserved "00" bit combination may be employed to activate/deactivate the transmission of the reference signal. An initial state may signaled by RRC signaling. Alternatively, the initial state may be an agreed-upon. Alternatively, a default option may be agreed upon or signaled by RRC signaling.

In another option, the gNB 170 may employ one bit of bits 3-8 of the "Short Message" to signal activation or deactivation of reference signal transmission (see FIG. 9 and Table 6.5-1, TS 38.331).

In another option, the gNB 170 may employ one bit of the six reserved bits in the DCI to define a new "Activate Deactivate Reference Signal" field. The new "Activate Deactivate Reference Signal" field set to 0 may be interpreted as an indication of reference signal transmission activation. The new "Activate Deactivate Reference Signal" field set to 1 may be interpreted as an indication of reference signal transmission deactivation.

Throughout the application, procedures and associated signaling for configuration updates, modification to existing configuration, etc. have been elaborated upon. These updated configurations while UE is in the RRC_INACTIVE state 2606 or the RRC_IDLE state 2602 may be used by the UE 110 in case of transitioning to other RRC states. For example, preamble configuration received during the RRC_INACTIVE state 2606 may be used in the RRC resume procedure 2664. As another example, a preamble configuration is received during the RRC_INACTIVE state 2606 and, later, the UE 110 is transitioned to the RRC_IDLE state 2602 by the RRC release procedure 2662; the UE 110 uses the preamble configuration received during the RRC_I-NACTIVE state 2606 in the RRC resume procedure 2624 to transition to the RRC_CONNECTED state 2604 from the RRC_IDLE state 2602.

It should be appreciated that one or more steps of the embodiment methods provided herein may be performed by corresponding units or modules. For example, data may be transmitted by a transmitting unit or a transmitting module. Data may be received by a receiving unit or a receiving module. Data may be processed by a processing unit or a processing module. The respective units/modules may be hardware, software, or a combination thereof. For instance, one or more of the units/modules may be an integrated circuit, such as field programmable gate arrays (FPGAs) or application-specific integrated circuits (ASICs). It will be appreciated that where the modules are software, they may be retrieved by a processor, in whole or part as needed, individually or together for processing, in single or multiple instances as required, and that the modules themselves may include instructions for further deployment and instantiation.

Although a combination of features is shown in the illustrated embodiments, not all of them need to be combined to realize the benefits of various embodiments of this disclosure. In other words, a system or method designed according to an embodiment of this disclosure will not necessarily include all of the features shown in any one of the Figures or all of the portions schematically shown in the Figures. Moreover, selected features of one example embodiment may be combined with selected features of other example embodiments.

Although this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

What is claimed is:

1. A method comprising:
receiving, by a user equipment (UE) from a base station, a control message, the control message instructing the UE to configure a sounding reference signal (SRS) for SRS transmission in a radio resource control (RRC) inactive (RRC_INACTIVE) state, wherein the UE is in a RRC connected (RRC_CONNECTED) state;
responsive to the receiving the control message, entering, by the UE, into the RRC_INACTIVE state from the RRC_CONNECTED state; and
transmitting, by the UE, a sounding reference signal (SRS) transmission while in the RRC_INACTIVE state.

2. The method of claim 1, wherein the SRS transmission comprises a semi-persistent SRS transmission.

3. The method of claim 2, further comprising activating the semi-persistent SRS transmission responsive to receiving a media access control-control element (MAC-CE).

4. The method of claim 2, further comprising deactivating the semi-persistent SRS transmission responsive to receiving a media access control-control element (MAC-CE).

5. The method of claim 1 where the SRS transmission comprises a periodic SRS transmission.

6. The method of claim 5, further comprising activating the periodic SRS transmission responsive to the receiving the control message.

7. A user equipment (UE) comprising:
a receiver configured to receive, from a base station, a control message, the control message instructing the UE to configure a sounding reference signal (SRS) for SRS transmission in a radio resource control (RRC) inactive (RRC_INACTIVE) state, wherein the UE is in a RRC connected (RRC_CONNECTED) state;
a processor configured to, responsive to the receiving the control message, enter into the RRC_INACTIVE state from the RRC_CONNECTED state; and
a transmitter configured to transmit a SRS transmission while the UE is in the RRC_INACTIVE state.

8. The UE of claim 7, wherein the SRS transmission comprises a semi-persistent SRS transmission.

9. The UE of claim 8, wherein the transmitter is further configured to transmit the semi-persistent SRS transmission as activated by a media access control-control element (MAC-CE).

10. The UE of claim 8, wherein the transmitter is further configured to cease transmitting the semi-persistent SRS transmission as deactivated by a media access control-control element (MAC-CE).

11. The UE of claim 7, wherein the SRS transmission comprises a periodic SRS transmission.

12. The UE of claim 11 wherein the transmitter is further configured to transmit the semi-persistent SRS transmission responsive to the receiver receiving the control message.

13. A non-transitory computer readable storage medium, having stored thereon computer-executable instructions, that when executed by a processor in a user equipment (UE), cause the processor to perform the following method:
receiving, from a base station, a control message, the control message instructing the UE to configure a sounding reference signal (SRS) for SRS transmission in a radio resource control (RRC) inactive (RRC_INACTIVE) state, wherein the UE is in a RRC connected (RRC_CONNECTED) state;
responsive to the receiving the control message, entering into the RRC_INACTIVE state from the RRC_CONNECTED state; and
transmitting a SRS transmission while in the RRC_INACTIVE state.

14. The non-transitory computer readable storage medium of claim 13, wherein the SRS transmission comprises a semi-persistent SRS transmission.

15. The non-transitory computer readable storage medium of claim 14, wherein the method further comprises activating the semi-persistent SRS transmission responsive to receiving a media access control-control element (MAC-CE).

16. The non-transitory computer readable storage medium of claim 14, wherein the method further comprises deactivating the semi-persistent SRS transmission responsive to receiving a media access control-control element (MAC-CE).

17. The non-transitory computer readable storage medium of claim 13, wherein the SRS transmission comprises a periodic SRS transmission.

18. The non-transitory computer readable storage medium of claim 17, wherein the method further comprises activating the periodic SRS transmission responsive to the receiving the control message.

* * * * *